United States Patent
Thornberg et al.

(10) Patent No.: US 10,803,456 B1
(45) Date of Patent: Oct. 13, 2020

(54) FACTORIZATION-BASED DATA OBJECT PROCESSING

(71) Applicant: Chicago Mercantile Exchange Inc., Chicago, IL (US)

(72) Inventors: Carl Erik Thornberg, Stockholm (SE); Kalle Tomas Thurin, Sollentuna (SE); Jonas Christoffer Klemming, Stockholm (SE); David Sebastian Rydberg, Huddinge (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 16/593,696

(22) Filed: Oct. 4, 2019

Related U.S. Application Data

(60) Provisional application No. 62/902,920, filed on Sep. 19, 2019, provisional application No. 62/900,200, (Continued)

(51) Int. Cl.
*G06Q 30/02* (2012.01)
*G06Q 20/38* (2012.01)
(Continued)

(52) U.S. Cl.
CPC ......... *G06Q 20/387* (2013.01); *G06Q 10/04* (2013.01); *G06Q 20/389* (2013.01); *G06Q 20/4016* (2013.01)

(58) Field of Classification Search
CPC .................................................. G06Q 30/02
See application file for complete search history.

(56) References Cited

U.S. PATENT DOCUMENTS 8,494,953 B1 7/2013 Boberski
8,533,101 B2 * 9/2013 Cheung .................. G06Q 40/04
                                                            341/75

(Continued)

OTHER PUBLICATIONS

"Interest Rate Swaps Compression: A Progress Report", ISDA Study, Feb. 2012, 9 pages.

(Continued)

*Primary Examiner* — Marilyn G Macasiano
(74) *Attorney, Agent, or Firm* — Lempia Summerfield Katz LLC

(57) ABSTRACT

A system includes first logic to obtain a plurality of constituent data streams for each data object of a plurality of objects, second logic to analyze the plurality of constituent data streams to allocate each constituent data stream to one of a set of primary groups, third logic to assign the constituent data streams within each primary group of the set of primary groups having aligned timing to a netting group of the primary group, fourth logic to generate, for each netting group of each primary group of the set of primary groups, a plurality of continuous data streams by combining two or more of the constituent data streams within the netting groups, fifth logic to define a plurality of new data objects from the generated plurality of continuous data streams, each new data object of the plurality of new data objects specifying a plurality of continuous data streams associated with a pair of primary groups of the set of primary groups, sixth logic to incorporate at least one new data object of the plurality of new data objects into the set of data objects to effectuate adjustments to the set of data objects, and seventh logic to cause the processor to incorporate store, the adjustments to the set of data objects.

30 Claims, 15 Drawing Sheets

Related U.S. Application Data filed on Sep. 13, 2019, provisional application No. 62/897,213, filed on Sep. 6, 2019, provisional application No. 62/878,914, filed on Jul. 26, 2019.

(51) Int. Cl.
*G06Q 10/04* (2012.01)
*G06Q 20/40* (2012.01)

(56) References Cited

U.S. PATENT DOCUMENTS

| | | | |
|---|---|---|---|
| 2003/0083978 A1* | 5/2003 | Brouwer | G06Q 10/0637 705/37 |
| 2005/0256799 A1* | 11/2005 | Warsaw | G06Q 40/04 705/37 |
| 2010/0241551 A1 | 9/2010 | Brouwer | |
| 2010/0325030 A1 | 12/2010 | Brouwer | |
| 2011/0276460 A1 | 11/2011 | Brouwer | |
| 2011/0276461 A1 | 11/2011 | Brouwer | |
| 2012/0023002 A1 | 1/2012 | Brouwer | |
| 2012/0023003 A1 | 1/2012 | Brouwer | |
| 2012/0303509 A1 | 11/2012 | Brouwer | |
| 2015/0262305 A1* | 9/2015 | Bawadhankar | G06Q 40/06 705/36 R |

OTHER PUBLICATIONS

Extended European Search Report in European Patent Application No. 20 15 0729, dated Jul. 2, 2020, 11 pages.

\* cited by examiner

Legs and cash flows of two
netting groups in a core group

Possible new legs to create

US 10,803,456 B1

FACTORIZATION-BASED DATA OBJECT PROCESSING

CROSS-REFERENCES TO RELATED APPLICATIONS

This application claims the benefit of the filing date under 35 U.S.C. § 119(e) of U.S. Provisional Application Ser. No. 62/902,920, filed Sep. 19, 2019, U.S. Provisional Application Ser. No. 62/900,200, filed Sep. 13, 2019, U.S. Provisional Application Ser. No. 62/897,213, filed Sep. 6, 2019, and U.S. Provisional Application Ser. No. 62/878,914, filed Jul. 26, 2019, the entire disclosures of each of which are hereby incorporated by reference and relied upon.

BACKGROUND

While costs associated with computers and memory storage products have been falling with technological improvements, available computing resources remain at a premium. For example, the processing of electronic communications has led to substantial increases in necessary memory usage and computing processing power. In many cases, computing centers tasked with implementing and maintaining these electronic communications are constrained by existing or aging hardware and software resources, and budgetary concerns regarding the purchase, upgrade, or repair of the hardware and software infrastructure components.

With the ever-increasing amount of data being processed, computing resources, such as memory and/or other storage, may be depleted and additional resources may need to be added to the system. Additionally, the data stored may be communicated between computing systems for processing. These communication requirements may result in slowed communications capability, as communication bandwidth on an organization's network may be a finite, limited resource.

For these and other reasons, improvements to data management capabilities, including intelligent compression of data, are warranted. The compression should be intelligent in the sense that the compression only removes data that is redundant or otherwise indicative of unnecessary information. In that way, data indicative of information of value is maintained despite the data compression.

DETAILED DESCRIPTION

Figure 1:
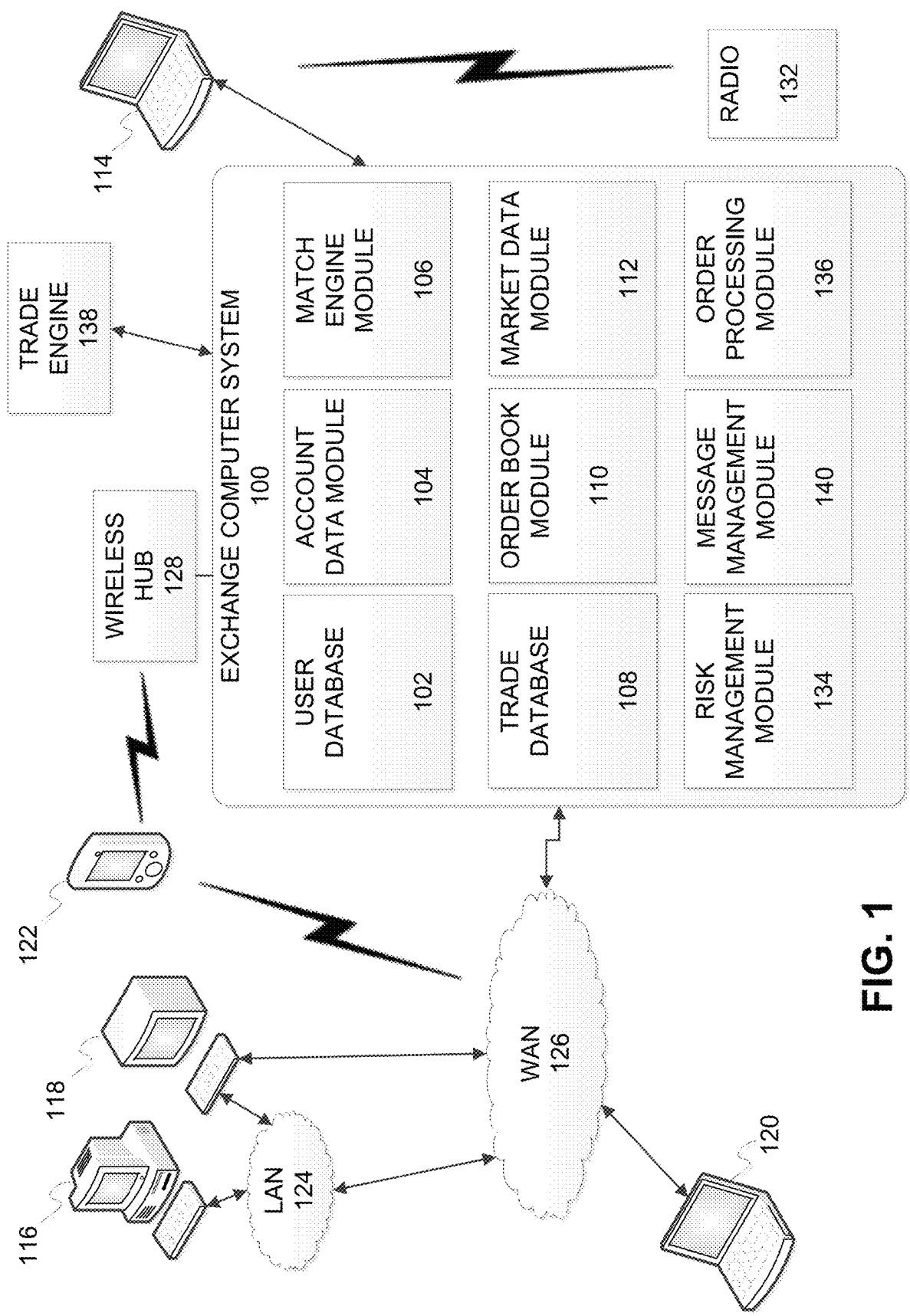
FIG. 1 depicts an illustrative computer network system that may be used to implement aspects of the disclosed embodiments.

Methods and systems of processing a set of data objects are described. The processing of the disclosed methods and systems is directed to effectuating one or more adjustments to the set of data objects in a manner that reduces the number of data objects in the set, or otherwise reduces a magnitude, or other parameter, associated with the set of data objects. The disclosed methods and systems may be configured to find an optimal adjustment to achieve a maximum reduction, e.g., reduction of the number of data objects, or magnitude. For example, the optimal adjustment may minimize the number of data objects in the set and/or minimize the magnitude or other parameter associated with the set of data objects. Other magnitudes associated with the data objects (either new or existing data objects) may be determined after the optimization.

The processing of the disclosed methods and systems is, in some embodiments, configured to provide additional degrees of freedom for the optimization. As described below, the disclosed methods and systems may generate new data objects to provide the additional degrees of freedom for the optimization. The additional degrees of freedom effectively provide additional opportunities for optimizing the adjustments. The new data objects are provided through a procedure implemented by the disclosed methods and systems that factors, or decomposes, each data object into a plurality of constituent data streams. The procedure then uses combinations of those constituent data streams to generate new data streams, and/or define the new data objects, for use in the optimization. The new data streams thus may be considered to be generated from the factors of the existing data objects, i.e., by refactoring the existing data objects. The new data objects are then incorporated into the set of data objects to effectuate the optimizing adjustments. The incorporation of the new data objects and subsequent optimizing adjustments (e.g., compression) does not require additional information (e.g., from the sources of the existing data objects, such as valuation data from a bank) because of the refactoring manner in which the new data objects are generated.

These and other aspects of the disclosed methods and systems present technical solutions to the technical problems presented by the processing of sets of data objects. For instance, one technical problem involves data object sets that are excessively large. The size of the data object set presents storage and other processing requirements and challenges. However, indiscriminate deletion of data objects to reduce the size of the data object set is not possible, insofar as information will be lost. Therefore, the technical problem also involves finding an intelligent way to reduce the size of the data object set. The disclosed methods and system provide an intelligent procedure for reducing the size (and/or other size-related parameters) of the data object set to provide solutions to such storage and processing challenges without incurring detrimental information loss. Yet another technical benefit providing by the disclosed methods and systems involves a reduction in communications or other data transmissions regarding the new data objects to be incorporated into a data object set. The refactoring of existing data objects allows the new data objects to be valued or otherwise configured without requiring an entity to send more information. Network traffic and network processing loads may therefore decrease.

The disclosed methods and systems may be implemented in connection with coupon blending and other types of risk neutral compression procedures involving data object sets representative of financial positions. Each financial position is created by a trade or transaction, such as an interest rate swap. In the case of interest rate and other swap trades, each trade may create two positions, or legs, e.g., a "receive" position and a "pay" position for the incoming and outgoing cash flows, respectively. Coupon blending involves a single party (e.g., a bank) attempting to lower the size of a portfolio while remaining cash flow neutral. The cash flows thus remain the same, but the gross notional amount of funds involved in the positions of the portfolio is lowered, as described in the examples below. The disclosed methods and systems are also useful in compression scenarios involving multiple parties. So-called multilateral compression involves compressing the portfolios of more than one party in accordance with risk constraints specified by each party. The risk constraints specify the degree to which the party's cash flows and/or other risk parameters (e.g., bucketed interest, delta, etc.) may deviate from a cash flow neutral adjustment. The multilateral compression is usually provided in a manner that is risk neutral for a central or other controlling party, such as a clearinghouse (e.g., central counterparty clearinghouse, or CCP) or exchange. Keeping the CCP risk neutral is thus another constraint on the optimization implemented by the disclosed methods and systems.

The disclosed methods and systems may be considered to implement a refactoring of the set of data objects for use in compression and other adjustments. Refactoring generally adds new data objects and, thus, degrees of freedom, to the optimization that finds the optimal compression or other adjustments. For example, in some financial applications, the refactoring may be used to create and value new trades. The refactoring allows the compression to be implemented without requiring banks to send more data (e.g., valuation data). The refactoring of the disclosed methods and systems provides an automatic way to value the new data objects, i.e., the new trades, based on the existing trades. Without such automatic valuation, the banks or other parties are required to provide valuation data in conjunction with the compression, thereby necessitating further data communications.

The disclosed methods and systems may be used in financial applications other than coupon blending and multilateral compression. For instance, the disclosed methods and systems are not limited to risk-free netting compression involving a single party. The refactoring of the disclosed methods and systems may be used to create and value new trades as additional degrees of freedom in other types of compression scenarios.

A financial instrument trading system, such as a futures exchange, referred to herein also as an "exchange", such as the Chicago Mercantile Exchange Inc. (CME), provides a contract market where financial instruments, for example futures and options on futures, are traded. The term "futures" is used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time.

Typically, the exchange provides for a centralized "clearinghouse" through which all trades made must be confirmed, matched, and settled each day until offset or delivered. The clearinghouse is an adjunct to the exchange, and may be an operating division of the exchange, which is responsible for settling trading accounts, clearing trades, collecting and maintaining performance bond funds, regulating delivery, and reporting trading data. One role of the clearinghouse is to mitigate credit risk. Clearing is the procedure through which the clearinghouse becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearinghouse.

An interest rate futures contract, also referred to as an interest rate future, is a futures contract having an underlying instrument/asset that pays interest, for which the parties to the contract are a buyer and a seller agreeing to the future delivery of the interest bearing asset, or a contractually specified substitute. Such a futures contract permits a buyer and seller to lock in the price, or in more general terms the interest rate exposure, of the interest-bearing asset for a future date.

An interest rate swap ("IRS") is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Another common form of IRS, knows as an overnight index swap, exchanges at its termination (or at other intervals, e.g., every three months) a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

An interest rate swap futures contract is one in which the underlying instrument is an interest rate swap. As such, an interest rate swap futures contract permits "synthetic" exposure to the underlying interest rate swap, i.e., without entailing actual ownership of the underlying IRS.

In a typical futures trading environment, the standardization of futures contracts and the nature of the central counterparty based trading system allows an exchange, or market participant thereof, to net together offsetting positions in the same contract for the purpose of reducing the margin requirement to reflect the reduced risk of loss of such positions and/or to outright consolidate positions to reduce the size of the portfolio and/or reduce transaction fees therefore. As the exchange, being a central counterparty to all transactions, ensures that each counterparty is not at risk of loss due to the default of the other party, such netting and consolidation by one market participant does not affect the positions and risk undertaken by another participant.

In the case of IRS contracts, however, the variability in the characteristics of positions which may exist in any given portfolio, such as the maturity date, coupon, etc. may make it difficult to identify suitable positions for netting though, for example, such positions, though not identical, may exist which are similar enough as to represent a reduced risk of loss meriting a reduction in the margin requirement. Further complicating this process is the bilateral nature of an IRS contract where a particular position of one party is coupled with a counter position of a counterparty thereto. For instance, an adjustment to improve one party's portfolio may affect the portfolio of the counterparty, in which case adjustments to the counterparty's portfolio may become necessary. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not be consolidated without necessarily affecting not only the economic purpose intended by the market participant holding that portfolio but also the economic purposes which may be different, of any counter party market participants thereto.

When used in coupon blending, the disclosed methods and systems may not include valuing the new trades. The disclosed methods and systems may, in coupon blending and other cases, include a calculation to confirm that the portfolio adjustments are cash flow flat (or within one or more risk constraints). In multilateral compression applications, the new trades are valued exactly as if the parties (e.g., banks) implemented a valuation in their own system. As described below, the decomposition of the existing trades into constituent legs and leg segments (data streams) and the subsequent refactoring of such leg segments into new trades allows the valuation data for the existing trades to be used to value the new trades. In this way, the disclosed methods and systems may verify and report all compression results with constraint outcomes using valuations already approved by the parties.

Although described in connection with examples involving data objects representative of interest rate swap (IRS) trades, the disclosed methods and systems are useful in connection with other types of data objects. For instance, the data objects may be representative of other types of trades or transactions, including, for instance, various types of credit default swap transactions. Still other types of data objects may be processed by the disclosed methods and systems, including, for instance, other data storage or processing systems for which data compression is useful. The types, sources, and other characteristics of the data objects may vary accordingly.

As discussed above, an IRS is a contractual agreement between two parties, i.e., the counterparties, where one stream of future interest payments is exchanged for another, e.g., a stream of fixed interest rate payments in exchange for a stream of floating interest rate payments, based on a specified principal amount. An IRS may be used to limit or manage exposure to fluctuations in interest rates. One common form of IRS exchanges a stream of floating interest rate payments on the basis of the 3-month London interbank offered rate for a stream of fixed-rate payments on the basis of the swap's fixed interest rate. Other types of IRSs exchange other floating rate payments over the timespan of the swap for a fixed rate payment.

Due to the nature of interest rate swap trading, a given portfolio may include a large number of trades, and thus a large number of individually unique positions, also referred to as line items. Each swap trade presents a pay position and a receive position for each party to the trade. A pay position specifies a stream of payment obligations, such as pay 5% fixed on a notional amount (e.g., $5 million (M)) over a certain time at a particular period pay period. A receive position specifies a stream of incoming payments, such as receive floating interest rate payments on a notional amount (e.g., $5M) over a certain time at a particular pay period. Each portfolio may include a large number of similar, but not identical, positions. As a result, a new function for clearinghouses to net similar but not identical line items is warranted. The exchange or central counterparty has robust capability to allow a trader to initiate a position (e.g., buy or sell) or unwind the same position (e.g., sell or buy), where unwinding a position may be understood to have an opposing or counter effect as initiating a position. However, the central counterparty has no mechanism to group positions by similar characteristics and then eliminate overlapping line items. In some cases, compression may involve or refer to netting non-identical line items.

Compression generally reduces the notional value of economically offsetting positions without having to necessarily unwind exactly the same position that was initiated. Previous systems have employed compression generally in dealer-to-dealer trading. Given the homogeneity of the user base in existing systems, previously there was little need for systems to accommodate unique compression criteria. However, as the user base for cleared IRS grows, so too do the differences in compression criteria, and the need to pair large numbers of potentially disparate users.

Further, as was described, positions in one portfolio cannot necessarily be netted or consolidated without affecting counter-positions held in the portfolios of the counter-party market participants thereto which may have different criteria for determining nettable/consolidatable positions according to their unique economic purpose. In addition, the exchange or central counterparty may prohibit or inhibit each market participant from being privy to the portfolios and/or criteria of other market participants so as to preserve the anonymity thereof.

While the disclosed embodiments may be discussed in relation to IRS contracts or trades, it will be appreciated that the disclosed embodiments may be applicable to other bilateral contracts, or other multilateral relationships. For instance, the disclosed methods and systems may also be useful in connection with other types of swap trades, including, for instance, those involving cash flows, such as basis swaps, constant maturity swaps, and cross-currency swaps. The disclosed methods and systems may be used in connection with any other market now available or later developed.

In some cases, the compression provided by the disclosed methods and systems may be initiated and otherwise implemented automatically. For example, the disclosed methods and systems may be configured to automatically process a set of data objects upon the detection of a trigger event or condition, such as a set of data objects exceeding a data size threshold. Alternatively or additionally, the disclosed methods and systems may be configured to automatically evaluate sets of data objects for compression, e.g., on a periodic or regular basis.

FIG. 1 depicts a trading network environment for implementing trading systems and methods with credit control in accordance with one example. In this case, an exchange computer system 100 receives orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herein unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the computer 400 described below with respect to FIG. 4. A user database 102 may be provided which includes information identifying traders and other users of exchange computer system 100, such as account numbers or identifiers, user names and passwords. An account data module 104 may be provided, which may process account information that may be used during trades and/or credit control, as described below. A match engine module 106 may be included to match bid and offer prices and may be implemented with software that executes algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users.

A risk management module 134 may be included to compute and determine a user's risk utilization in relation to the user's defined risk thresholds. In some cases, the risk management module 134 may be used to implement provide other services, such as compression-related and other data object set processing services, examples of which are described herein, and as will be addressed in connection with the example of FIG. 2.

An order processing module 136 may be included to decompose delta based and bulk order types for processing by the order book module 110 and/or match engine module 106. A volume control module 140 may be included to, among other things, control the rate of acceptance of mass quote messages in accordance with one or more aspects of the disclosed embodiments. It will be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, or other component of the exchange computer system 100.

Any number of the above-described trading system components may be used or otherwise involved in implementation of the data object set processing of the disclosed methods and systems.

The trading network environment shown in FIG. 1 includes example computer devices 114, 116, 118, 120 and 122 which depict different example methods or media by which a computer device may be coupled with the exchange computer system 100 or by which a user may communicate, e.g. send and receive, trade or other information therewith. It will be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An example computer device 114 is shown directly connected to exchange computer system 100, such as via a T1 line, a common local area network (LAN) or other wired and/or wireless medium for connecting computer devices, such as the network 420 shown in FIG. 4 and described below with respect thereto. The example computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the example computer device 114 or a user thereof. The user of the example computer device 114, or the example computer device 114 alone and/or autonomously, may then transmit the trade or other information to the exchange computer system 100.

Example computer devices 116 and 118 are coupled with the local area network ("LAN") 124, which may be configured in one or more of the well-known LAN topologies, e.g. star, daisy chain, etc., and may use a variety of different protocols, such as Ethernet, TCP/IP, etc. The example computer devices 116 and 118 may communicate with each other and with other computer and other devices, which are coupled with the LAN 124. Computer and other devices may be coupled with the LAN 124 via twisted pair wires, coaxial cable, fiber optics or other wired or wireless media. As shown in FIG. 1, an example wireless personal digital assistant device ("PDA") 122, such as a mobile telephone, tablet based computer device, or other wireless device, may communicate with the LAN 124 and/or the Internet 126 via radio waves, such as via WiFi, Bluetooth and/or a cellular telephone based data communications protocol. The PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Example computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto.

As was described above, the users of the exchange computer system 100 may include one or more market makers that may maintain a market by providing constant bid and offer prices for a derivative, security, or other financial product to the exchange computer system 100, such as via one of the example computer devices depicted. The exchange computer system 100 may also exchange information with other trade engines, such as trade engine 138.

The operations of computer devices and systems shown in FIG. 1 may be controlled by computer-executable instructions stored on a computer-readable storage medium (as opposed to computer-readable communication media involving propagating signals) or a non-transitory computer-readable storage medium. For example, the example computer device 116 may include computer-executable instructions for receiving order information from a user and transmitting that order information to exchange computer system 100. In another example, the example computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The exchange computer system 100 may be configured to implement the data object set processing of the disclosed embodiments in connection with IRS and/or other trades. In such cases, each trade corresponds with a data object. A set of data objects may correspond with a portfolio of a party, such as a bank. The processing of the set of data objects may then involve or include compression of the portfolio. The compression may be unilateral, and directed solely to the portfolio of a single party, e.g., as in coupon blending. The compression may alternatively be multilateral, when the compression involves the portfolios of multiple parties. Thus, in multilateral cases, the set of data objects processed by the disclosed embodiments includes the portfolios of the multiple parties.

In some embodiments, the data object set processing may involve decomposing each trade (or other data object) in the set into legs (or other constituent data streams) in order to support refactoring, or other re-composition, of segments of the legs (or other streams) into possible new trades (or other data objects). As described further below, some of the new trades (or other data objects) are incorporated into the data set to provide additional opportunities, or degrees of freedom, to implement the portfolio compression or other data object set processing. The new trades (or other data objects) are configured in accordance with the legs (or other streams) of the existing trades (or other data objects) and otherwise configured (e.g., scaled) to implement the portfolio compression or other data object set processing.

In the example of FIG. 1, compression services provided by the disclosed embodiments may be implemented as part of, or otherwise in connection, with the risk management module 134 and/or another module or component of the exchange computer system 100. Other module(s) and/or exchange computer systems may be used to provide the compression service(s). For example, the disclosed embodiments may be implemented by the module(s) and/or exchange computer systems described in U.S. Pat. No. 8,494,953 ("Interest rate swap compression match engine"), U.S. Patent Publication No. 2015/0262305 ("Coupon blending of swap portfolio"), and U.S. application Ser. No. 15/812,573 ("Listed options position compression system"), the entire disclosures of each of which are hereby incorporated by reference and relied upon. Alternatively or additionally, the disclosed embodiments may be implemented in connection with another computer system, such as the computer system of a third-party service provider engaged by a market participant for data object set processing, including, for example, a compression vendor. In still other cases, the disclosed embodiments may be implemented by an entity, e.g., a bank, holding or otherwise controlling the portfolio (or set of data objects) to be compressed or otherwise processed.

Some aspects of the disclosed methods and systems are directed to the practical application and technical benefit of reducing processor usage for calculations at compression clients (e.g., banks) and the amount of data needed to be sent from compression clients to a compression provider. Such processor usage reduction may be achieved by deriving full, non-approximative valuation and risk information, as if the client had done the calculations, of new trades. Such valuation may be provided by the disclosed embodiments through the use of information in the existing portfolio, as described below. In summary, the decomposition of the existing portfolio into constituent legs and leg segments, and use of such constituent legs to create new trades, allows the valuation of the existing portfolio to be used to value the new trades and generate the risk information. The valuation and other aspects of the disclosed methods and systems may thus be provided automatically.

The disclosed methods and systems, in some embodiments, provide the ability to increase (e.g., automatically increase) the number of degrees of freedom in risk-free compressions, e.g. coupon blending, which results in a smaller data representation of a swap portfolio, and may also be associated with a lower capital charge for parties (e.g., banks). From a technical perspective, use of the disclosed methods and systems for portfolio compression results in fewer redundant cash flow records and transactions stored, maintained and administered to represent a net portfolio. Reducing the number of records provides the technical benefit of lowering the storage and processing load of the exchange computer system 100 and/or other computer systems involved in the transactions, thereby improving the speed and other performance parameters of such systems. The increase in degrees of freedom may also be used for unilateral, risk-free SA-CCR optimization. These and other compressions may also be implemented with fewer communications or other data transmissions (e.g., transmission of valuation information) due to, for instance, the refactoring of the disclosed methods and systems, thereby lowering network traffic or other network loads.

Figure 2:
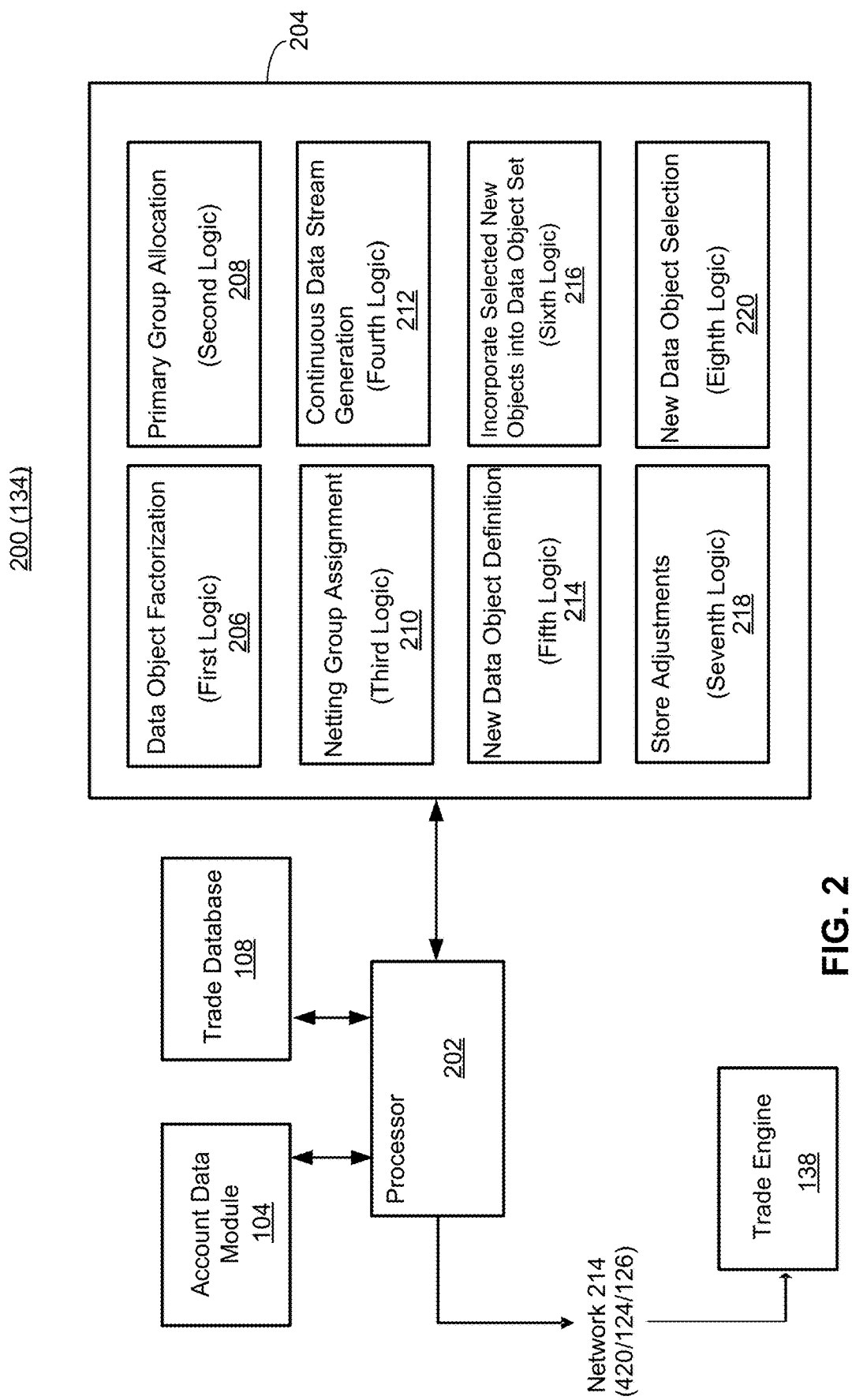
FIG. 2 is a block diagram of a system for processing a set of data objects in accordance with one example.

FIG. 2 depicts a system 200 for processing a set of data objects. The system 200 may correspond with some or all of the components of the trading environment or exchange computer system described above in connection with FIG. 1. For instance, one or more elements of the system 200 may be or otherwise correspond with the risk management module 134 (FIG. 1). In this case, the system 200 includes a processor 202 and a memory 204 that may be part of the risk management module 134 and/or another module or processor. In some cases, the processor 202 is or includes a customized processor, rather than a general-purpose processor or generic processor. For instance, the customized processor may include one or more hardware components configured to implement one or more aspects of the disclosed methods or systems.

In the example of FIG. 2, the set of data objects processed by the system 200 are representative of IRS or other trades. The processor 202 may accordingly be in communication with the trade database 108 to obtain the set of data objects and effectuate adjustments thereto. Alternatively or additionally, the processor 202 communicates with the account data module 104 and/or the trade engine 138 to obtain and/or adjust the set of data objects. In some cases, such communications to and from the processor 202 may be implemented via the distributed network 214.

The memory 204 is coupled with the processor 202 to provide access to computer-executable instructions stored on the memory 204. The instructions are directed to the data object set processing described herein. In this example, the memory 204 includes eight sets of instructions arranged in respective logic units stored therein. Each logic unit is executable by the processor 202. The number of logic units or instructions sets may vary. For example, the instruction sets may be integrated with one another to any desired extent. Alternative instructions may also be included.

The system 200 includes first logic 206 that, when executed by the processor 202, causes the processor 202 to obtain the plurality of constituent data streams for each data object of the plurality of objects. In some cases, obtaining the constituent data streams includes accessing a memory. For instance, data indicative of the constituent data streams may be provided, e.g., by respective sources of the data streams, such as parties holding a portfolio of trades. In other cases, obtaining the constituent data streams includes decomposing the set of data objects into the plurality of constituent data streams. In the example of FIG. 2, such decomposition includes factoring the set of data objects. In cases involving trades, factoring the set of data objects may include factoring or otherwise decomposing each trade into constituent legs.

The system 200 includes second logic 208 that, when executed by the processor 202, causes the processor 202 to analyze the plurality of constituent data streams to allocate each constituent data stream to one of a set of primary groups, the constituent data streams in each primary group of the set of primary groups having a common set of properties. The common set of properties may include one or more timing properties and a rate type property. For instance, in trade cases, examples of timing properties include a day-count methodology, a business day determination methodology, and a calendar type that identifies business holidays (e.g., a U.S. calendar, a British calendar, etc.). The rate type property may identify the index used to determine a floating interest rate. Additional or alternative properties may be used. For example, one property may be directed to establishing a pay period (e.g., every 6 months, annual, etc.) for the primary groups. Examples involving primary groups with these properties are described below in connection with FIGS. 13-20.

The system 200 includes third logic 210 that, when executed by the processor 202, causes the processor 202 to assign the constituent data streams within each primary group of the set of primary groups having aligned timing to one of the netting groups of the primary group. The aligned timing may involve data streams that have events that occur at the same intervals, and if the data streams occur in the same time segment, have the same timing. For example, data streams that have events that occur on the $15^{th}$ of each month may be considered to have aligned timing with respect to each other. In trade cases, the aligned timing may specify the date of the month or other point at which the cash flows end, or roll (e.g., cash flows with a six month pay period that end on March $20^{th}$ and September $20^{th}$). Further examples of data streams with aligned timing for assignment to netting groups are described below in connection with FIGS. 5-20.

The system 200 includes fourth logic 212 that, when executed by the processor 202, causes the processor 202 to generate, for each netting group, a plurality of continuous data streams by combining two or more of the constituent data streams within the netting group. The aligned timing of the constituent data streams within each netting group enables such combination. The resulting data streams are continuous in the sense that the data streams are free of gaps (i.e., gap-free) at the intervals at which events, such as cash flow payments, would otherwise occur. Combinations that result in discontinuous data streams may be discarded, or otherwise not utilized by the processing of the disclosed methods and systems.

Each constituent data stream may include one or more segments. For instance, each segment may be associated with a respective data event in the data stream. For example, each segment of a leg of a cash flow stream may correspond with a respective cash payment. Each such segment may be referred to as a leg segment. Generating the continuous data streams from the constituent data streams may accordingly involve or otherwise involve combining the two or more of the constituent data streams on a segment-by-segment basis. For instance, a first stream may include two segments, one between date U and date V, and another between date W and date X. A second stream may include two segments, one between date W and date X, and another between date Y and date Z. Combining the first and second streams segment by segment takes each date, or time span, separately. The first stream is the only contributor to the combination for the segment between date U and date V. The second stream is the only contributor to the combination for the segment between date Y and date Z. Conversely, both the first and second streams contribute to the combination for the segment between date W and date X.

The manner in which the constituent data streams are combined to generate the continuous data streams may vary. Execution of the fourth logic 212 may cause the processor 202 to add two or more constituent data streams. Alternatively or additionally, execution of the fourth logic 212 causes the processor 202 to subtract one of constituent data streams from another of constituent data streams. The addition or subtraction may include any number of the constituent data streams. Indeed, any combination of addition or subtraction of the constituent data streams may be implemented. For instance, and as shown in one of the examples described below, one possible combination for a netting group having constituent data streams A, B, C, and D would be A+C−B−D. Other combinations for that netting group may include all other combinations involving all four of the constituent data streams, as well as all combinations involving just two or three of the constituent data streams.

The system 200 includes fifth logic 214 that, when executed by the processor 202, causes the processor 202 to define a plurality of new data objects from the generated plurality of continuous data streams. The definition of the new data objects may be considered to involve a refactoring or re-composition of the existing data objects, as described below.

Each new data object of the plurality of new data objects specifies a plurality of continuous data streams associated with one pair of primary groups of the set of primary groups. Each pair of primary groups corresponds with one of a set of predetermined types of the set of data objects. For instance, the predetermined data object types may correspond with allowed types, necessary types, or other valid types. In trade cases, the predetermined object types may constitute the types of trades permitted (e.g., listed or otherwise available) by an exchange or clearinghouse.

The fifth logic 214 may further cause the processor 202 to determine which netting groups of each pair of primary groups have constituent data streams with aligned timing. For purposes of defining a new data object, the aligned timing may involve data streams that have events that occur at the same intervals, or at least some of the same intervals. For example, data streams that have events that occur on the 15$^{th}$ of each month may be considered to be aligned with data streams that have events that occur on the 15$^{th}$ of every third month. Further examples of netting groups are described below in connection with FIGS. 5-20.

The definition of the new data objects may be subjected to further analysis of the data streams to further align the data streams. For instance, each constituent data stream of the plurality of constituent data streams may extend from a start timing to an end timing. The execution of the fifth logic 214 may further cause the processor 202 to find, for each respective pair of primary groups, the constituent data streams and the generated continuous data streams within the determined netting groups having start timing in common and having end timing in common. The start timing and the end timing may correspond with the timing of the first event in the data stream and the last event in the data stream, respectively.

The system 200 includes sixth logic 216 that, when executed by the processor 202, causes the processor 202 to incorporate respective new data objects of the plurality of new data objects into the set of data objects to effectuate adjustments to the set of data objects. In trade cases, incorporation of the new data objects may or may not involve execution of one or more trades. For instance, the incorporation may involve or otherwise include modifying a spreadsheet or other data structure or record in which the data object set is presented. In such cases, one or more acts associated with the adjustments, such as execution of trades, may occur subsequently or separately.

The system 200 includes seventh logic 218 that, when executed by the processor 202, causes the processor 202 to store or transmit the adjustments to the set of data objects. For example, data indicative of the adjustments may be stored in a memory of the exchange computer system 100 (FIG. 1), such as the trade database 108 (FIG. 1). In some cases, such storage may involve or otherwise include storing the modified spreadsheet or other data structure in the memory. Alternatively or additionally, the data indicative of the adjustments may be transmitted to a module of the exchange computer system 100, such as the trade engine 138 (FIG. 1) for execution of one or more trades. In some cases (e.g., when a processor of the exchange computer system is implementing the seventh logic 218), the seventh logic 218 may cause the processor 202 to execute the one or more trades (e.g., complete the financial transaction(s) associated with the trade).

Additional or alternative logic sets may be included. For instance, in the example of FIG. 2, the system 200 includes eighth logic 220 that, when executed by the processor 202, causes the processor 202 to select new data objects from those defined via execution of the fifth logic 214 to offset one or more existing data objects. The offsetting may occur because the selected new data objects and the existing data objects have opposite polarities. In cases involving trades, the opposite polarities may correspond with the pay and receive directions of the cash flow streams established by the trade. For example, a position that involves paying a fixed cash flow stream and receiving a float cash flow stream may be assigned a positive polarity. Conversely, a position that involves receiving a fixed cash flow stream and paying a float cash flow stream may be assigned a negative polarity. The polarity designations may vary in other cases, e.g., in accordance with the nature of the positions, data streams, or data objects.

The selection may be made via implementation of an optimization procedure. In the example of FIG. 2, the execution of the eighth logic 220 further causes the processor 202 to implement a linear optimization of the set of data objects and the defined plurality of new data objects. The linear optimization may be configured to minimize a total magnitude presented by the set of data objects after the adjustments, while satisfying one or more constraints on the linear optimization. In trade examples, the problem solved by the linear optimization may be characterized as selecting the new data objects that result in using the least amount of notional while still satisfying the constraints. The nature of the total magnitude minimized by the linear optimization may vary in accordance with the nature of the data objects or data streams.

Figure 14:
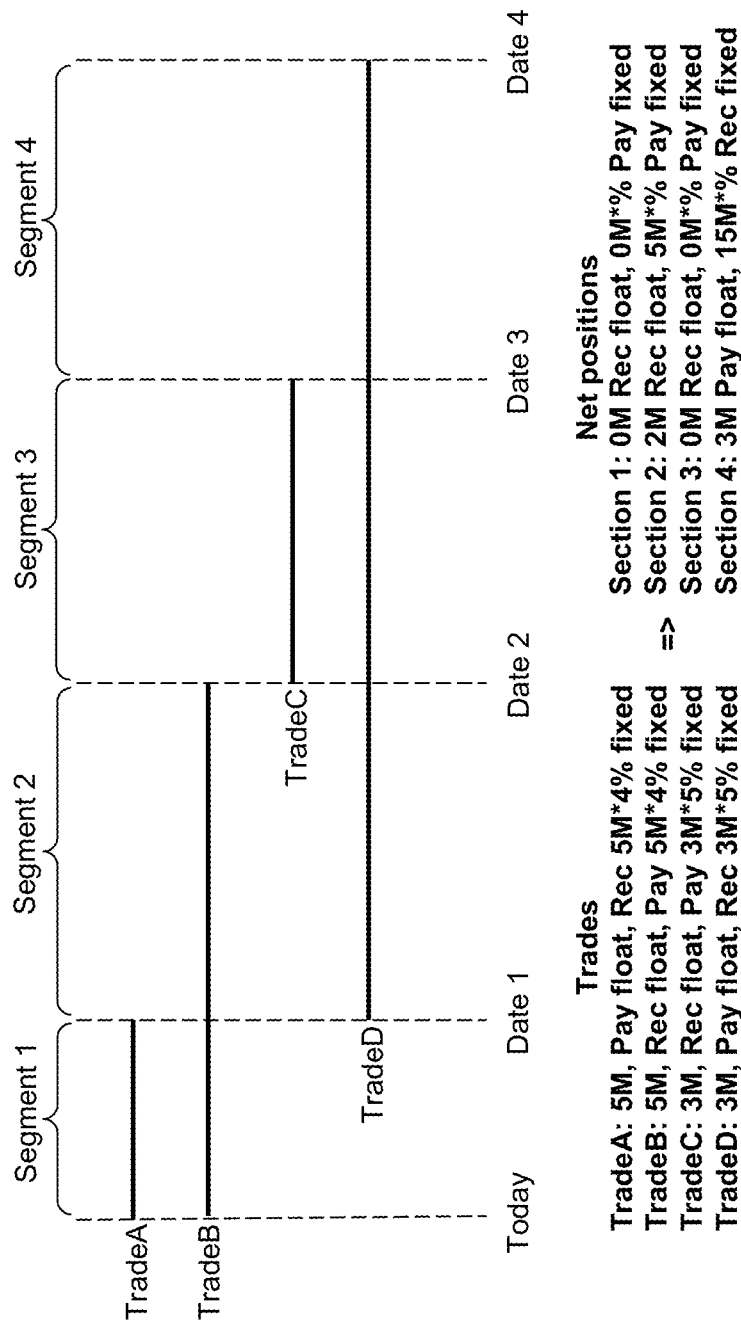
FIG. 14 depicts a plurality of data streams specified by the set of data objects shown in FIG. 13.
Figure 15:
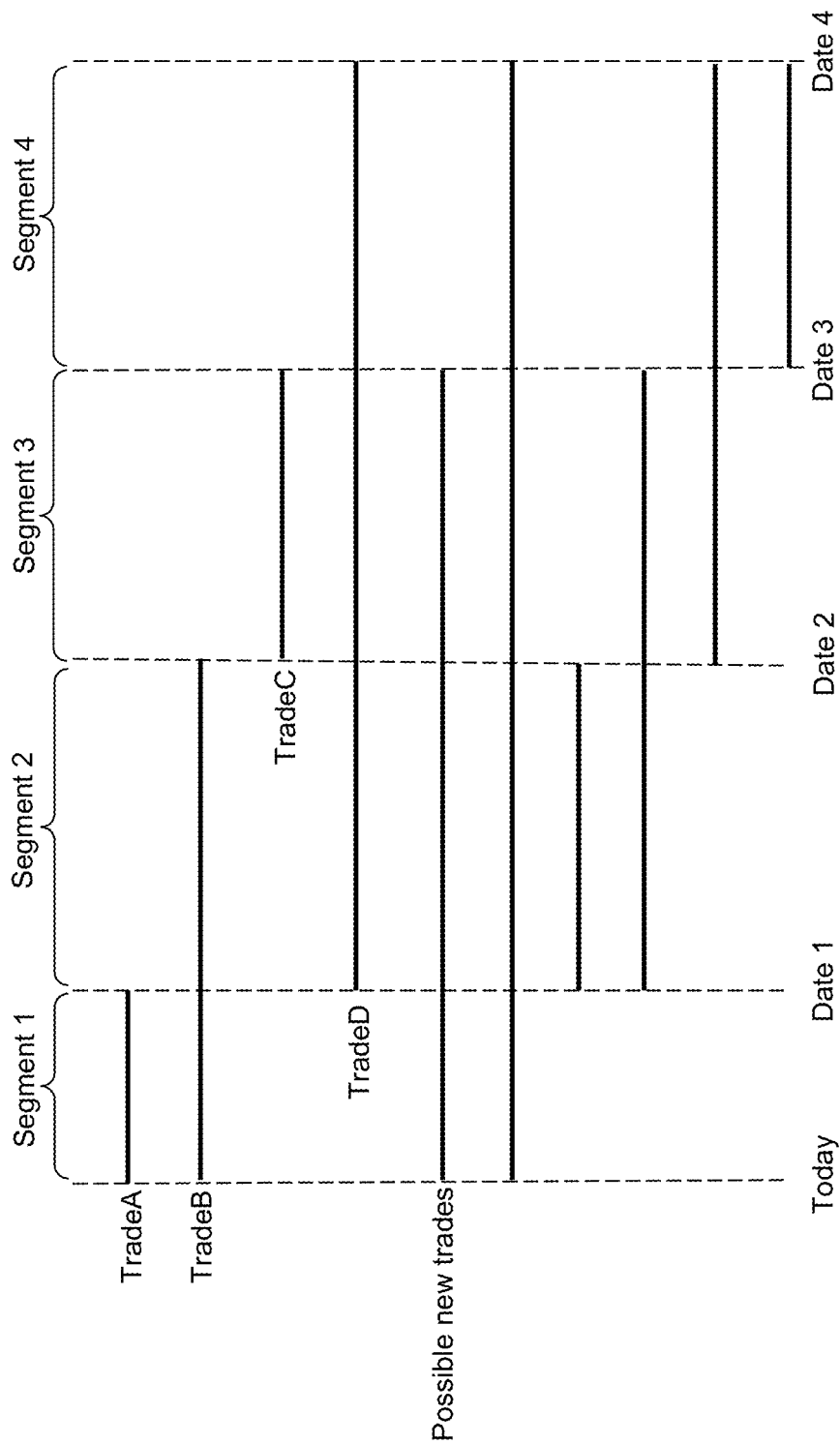
FIG. 15 depicts a plurality of continuous data streams generated by the disclosed methods and systems from the plurality of data streams shown in FIG. 14.
Figure 16:
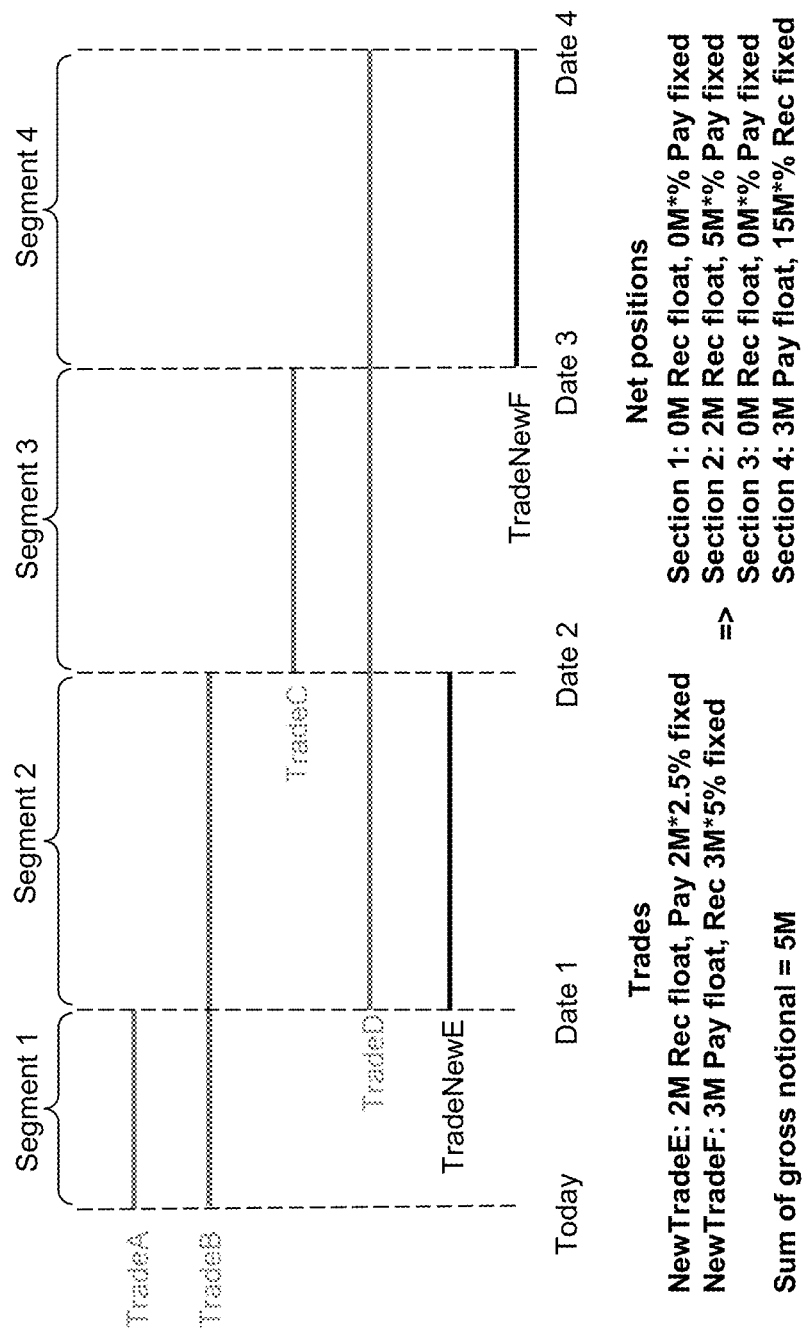
FIG. 16 depicts the definition and selection of a plurality of new data objects by the disclosed methods and systems for adjustment of the set of data objects shown in FIG. 13.

Each constituent data stream of the plurality of constituent data streams may have a length that spans one or more time periods. The linear optimization may be configured to maintain a respective net magnitude of the set of data objects for each time period across which the plurality of constituent data streams span. For instance, in financial examples, each time period may correspond with a segment of time for which a bank collectively evaluates the cash flows to determine a sum of gross notional, a net position, and/or other magnitudes. Examples of time segments or periods are shown in FIGS. 14-16. Each net magnitude acts as a constraint on the optimization. In examples involving coupon blending or other unilateral compression, the net magnitude may correspond with a risk level. In such cases, one or more constraints may be directed to requiring the adjustments to the set of data objects to maintain a flat (e.g., risk neutral) position at each time segment. In other compression cases, e.g., multilateral compression cases, some fluctuation in risk level may be tolerated. In such cases, one or more constraints specified by each party may be directed to limiting fluctuations in risk (e.g., at each time segment) to a respective tolerance level. Other constraints in multilateral compression cases may nonetheless specify that the adjustments keep a respective net magnitude of an entirety of the set of data objects constant for each time period across which the plurality of constituent data streams span. In that way, a CCP or other controller remains risk neutral at each time period, despite the fluctuations allowed by each party.

Further details regarding example constraints are provided below. The configuration of the linear optimization may vary in accordance with the nature of the data objects and data streams.

Execution of the eighth logic 220 may further cause the processor 202 to configure the respective new data objects by scaling a magnitude property and adjusting a rate property in accordance with each respective data object. Such scaling and adjustments may be used to configure the new data objects for the above-described offsetting. In trade cases, the magnitude property may be the notional of a cash stream. The rate property may be the fixed interest rate associated with a fixed cash stream. Examples of the resulting offsetting are described below. The nature of the magnitude property and the rate property may vary in accordance with the nature of the data objects and the data streams.

Further details regarding the functionality provided via execution of the above-described logic units, and by the system 200 more generally, are provided in connection with the examples described below.

Figure 3:
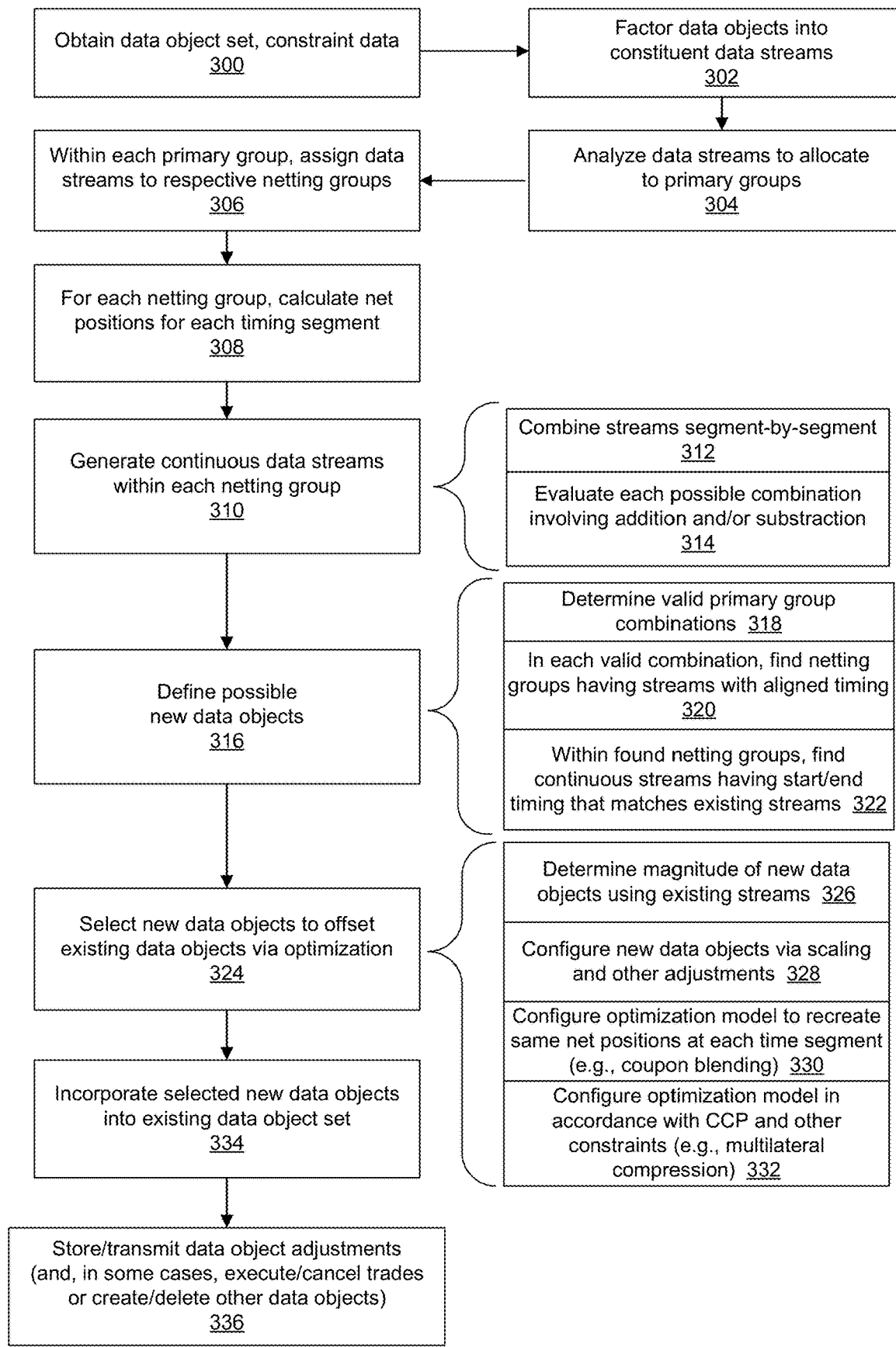
FIG. 3 is a flow diagram of a method for processing a set of data objects in accordance with one example.

FIG. 3 depicts a computer implemented method for processing a set of data objects. The method may show an example of the operation of the system 200 of FIG. 2, or another system.

Each act of the method is implemented by a processor, such as the processor 202 in the example of FIG. 2, a processor of the exchange computer system 100 in the example of FIG. 1, and/or another processor. The processor may be a processor used to implement a risk management module and/or another management processor. The processor may include any number of processors, such as processing cores or units, and may be disposed in any arrangement.

The method may begin with one or more acts directed to obtaining the constituent data streams. In the example of FIG. 3, the method begins with obtaining a set of data objects [block 300]. Each data object of the plurality of objects is decomposed into the plurality of constituent data streams [block 302]. In other cases, the constituent data streams may be obtained directly, e.g., by accessing a memory in which data indicative of the constituent data streams is stored.

The plurality of constituent data streams is analyzed to allocate each constituent data stream to one of a set of primary groups, the constituent data streams in each primary group of the set of primary groups having a common set of properties [block 304]. The constituent data streams are assigned within each primary group of the set of primary groups having aligned timing to a respective netting group of the primary group [block 306]. In some cases (e.g., IRS cases), the net positions for each timing segment are calculated for each netting group [block 308]. For each netting group, a plurality of continuous data streams is generated based on combining two or more of the constituent data streams within the netting groups [block 310]. The generation may involve combining the streams on a segment-by-segment basis [block 312], and/or an evaluation of each possible combination of streams via either addition or subtraction, or both addition and subtraction [block 314].

A plurality of new data objects is defined from the generated plurality of continuous data streams [block 316]. Each new data object of the plurality of new data objects specifies a plurality of continuous data streams associated with a respective pair of primary groups of the set of primary groups. Each continuous data stream of a new data object may be defined via a composition of the continuous data streams and, thus, a re-composition of the existing data objects from which the continuous data streams are generated. In some cases, the definition of new data objects involves or includes a determination of valid primary group combinations [block 318]. A valid combination may be a combination allowed by an exchange, such as those listed or otherwise made available by the exchange. In each valid combination, netting groups having streams with aligned timing are found (e.g., identified) [block 320]. Within those netting groups, the continuous streams having start/end timing that matches existing streams of the set of data objects are then found (e.g., identified) [block 322].

New data objects are selected to offset existing data objects via implementation of an optimization procedure (e.g., a linear optimization procedure) [block 324]. The optimization procedure operates on the set of data objects and the newly defined data objects. In some cases, a magnitude of each new data object may be determined using existing stream data [block 326]. The new data objects may be configured via scaling and/or other adjustments [block 328]. In coupon blending and other applications, the optimization may be configured (e.g., pre-configured or configured during the method) to recreate the same net positions at each time segment [block 330]. In multilateral compression and other applications, the optimization may be configured (e.g., pre-configured or configured during the method) in accordance with constraints for a central controller (e.g., a CCP) and all of the data sources (e.g., parties) [block 332]. For example, the constraints may specify that the central controller remains risk neutral while the other parties allow a predetermined amount of fluctuation (e.g., a risk tolerance level).

The new data objects of the plurality of new data objects selected via the optimization are incorporated into the set of data objects to effectuate adjustments to the set of data objects [block 334]. The adjustments to the set of data objects may then be stored and/or transmitted [block 336].

In some cases, the adjustments may be effectuated via execution or cancellation of trades.

The order of the acts or steps of the operation may vary from the example shown. For example, the calculation of net positions may occur after the generation of the continuous data streams, or at another time before the optimization procedure is implemented.

Additional, fewer, or alternative acts may be implemented. For example, the net positions at each timing segment may not be calculated. For instance, the net positions may be provided by a party (e.g., bank) or other data source. As another example, a determination of the valid primary group combinations may not be performed. The valid (e.g., listed or available) combinations may be predetermined or otherwise known.

Figure 4:
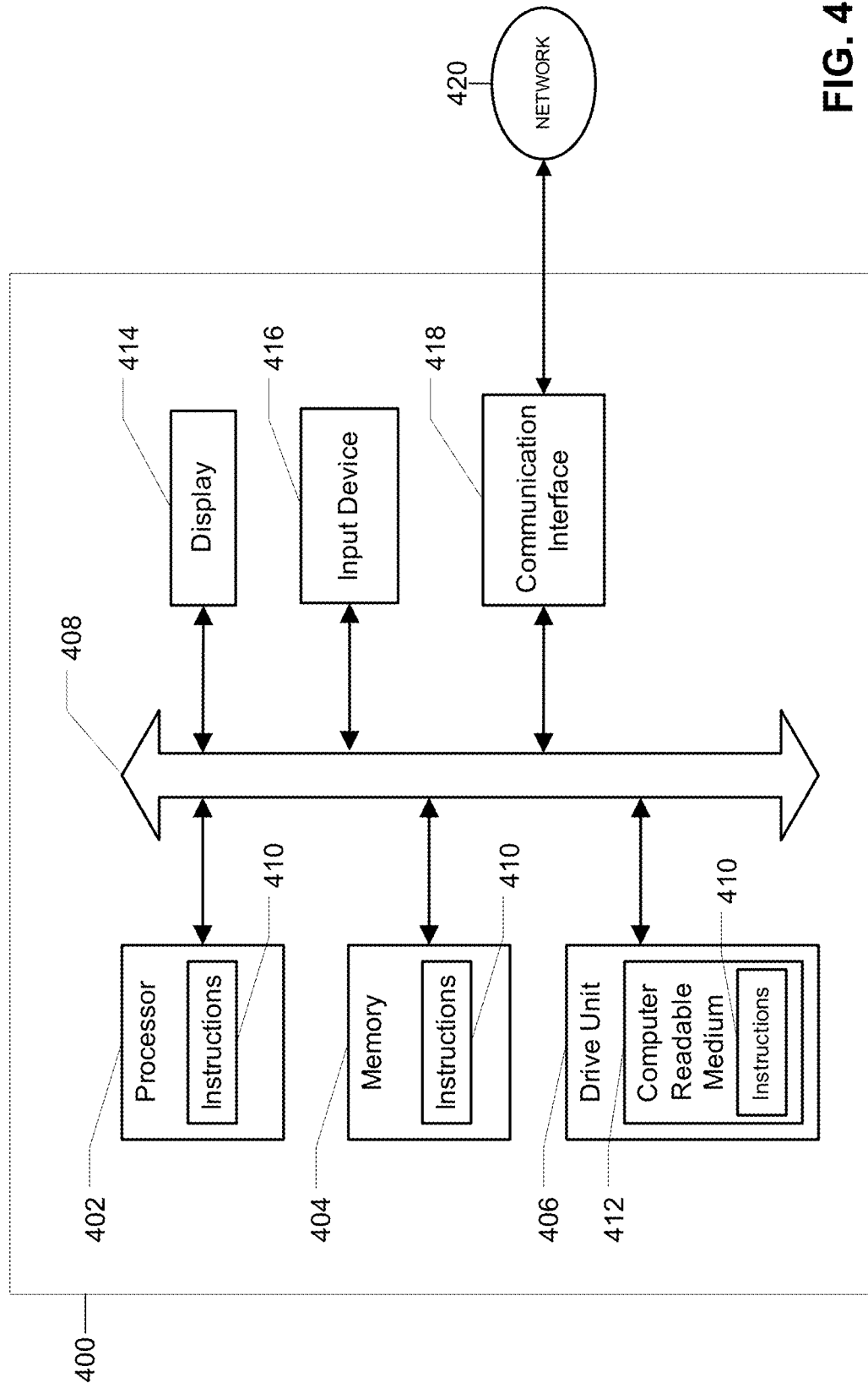
FIG. 4 shows an illustrative embodiment of a general computer system for use in or with the examples of FIGS. 1-3.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate with a drive unit 406 and other components of the system 400 via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data.

The memory 404 is operable to store instructions 410 executable by the processor 402. The functions, acts or tasks illustrated in the figures or described herein may be performed by the programmed processor 402 executing the instructions 410 stored in the memory 404. The instructions 410 may be loaded or accessed from a computer-readable storage medium 412 in the drive unit 406 or other data storage device. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include an optical or other disk drive unit as the drive unit 406. The disk drive unit 406 may include the computer-readable storage medium 412 in which one or more sets of instructions 410, e.g. software, can be embedded. Further, the instructions 410 may embody one or more of the methods or logic as described herein. In a particular embodiment, the instructions 410 may reside completely, or at least partially, within the memory 404 and/or within the processor 402 during execution by the computer system 400. The memory 404 and the processor 402 also may include computer-readable storage media as discussed above.

The present disclosure contemplates a computer-readable medium that includes instructions 410 or receives and executes instructions 410 responsive to a propagated signal, which may be received via a communication interface 418. The system 400 may be connected to a network 420 to communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

FIGS. 5-20 depict examples in which the disclosed methods and systems are applied legs of interest rate swaps. Such swaps, if they share the same cash flow structure and economics over a time span, may be added and subtracted to create new trades with exact valuation and risk as if valued by a client. To determine if the swaps have the same cash flow structure and economics over a time span, groups of legs that have aligned timing are found or identified by first decomposing all existing trades into legs and then grouping those on core or primary properties, such as float rate index, index period, calendars, etc. The notional and fixed rate, and start and end dates, may not be used for allocating the legs into the core or primary groups. These primary groups are then further assigned to netting groups using all cash flow date information so that legs in a netting group would be equal except for notional and fixed rate if they had the same start date and end date. In other words, if all legs in a netting group were to be stretched to span the time span between the first start date of all legs to the last end date of all legs they would be equal except for notional and fixed rate. In other words, all legs in a netting group are equal except for notional and fixed rate at overlapping time spans.

Figure 5:
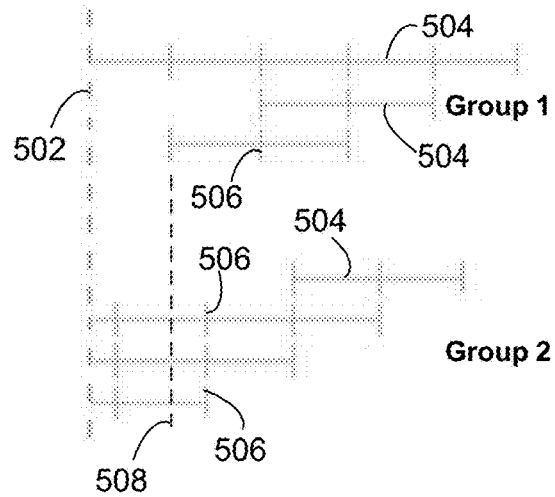
FIG. 5 depicts constituent data streams assigned to two netting groups of a primary group for a set of data objects to be processed by the disclosed methods and systems in accordance with one example.

FIG. 5 depicts an example of two netting groups, Group 1 and Group 2, in a primary, or core, group. A dashed line 502 represents time zero or other initial or reference time point. Each horizontal line 504 is representative of a leg or other constituent data stream having a time span indicated along a horizontal axis. Each short, vertical line 506 on a leg is a cash flow date or other event in the constituent data stream. Even though the two netting groups belong to the same primary group, the cash flows are not aligned, because the cash flow dates in Group 1 do not occur on the same dates as those in Group 2, as indicated by dashed line 508. That is, the timings of the cash flows do not align.

Figure 6:
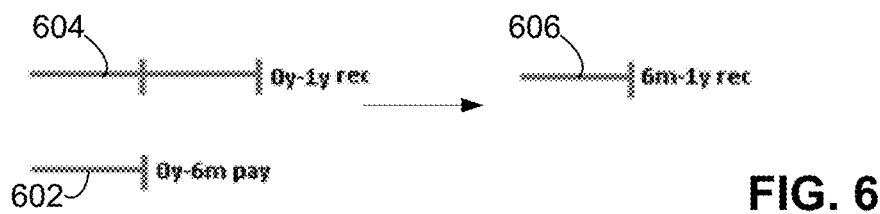
FIG. 6 depicts a continuous data stream generated by the disclosed methods and systems to provide additional degrees of freedom for adjustment of the set of data objects in accordance with one example.

FIG. 6 depicts an example of the manner in which legs may be combined. In this example, a spot payer swap leg 602 with one cash flow is subtracted from a spot receiver swap leg 604 with two cash flows resulting in a forward receiver swap leg 606 with one cash flow. While this example focuses on swaps with one fixed leg and one float leg, the disclosed methods and systems may be applied to other cases as well, such as basis swaps. In such cases, one "leg" will be the two float legs and the other "leg" will be the spread component.

Figure 7:
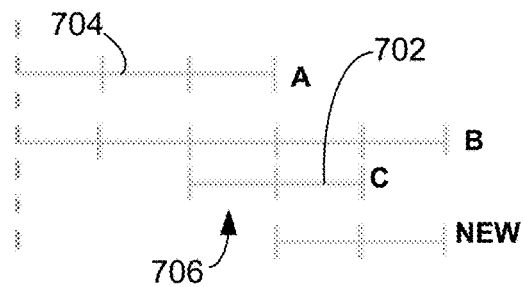
FIGS. 7 and 8 depict the generation of continuous data streams through combination of data streams within a netting group by the disclosed methods and systems in accordance with two examples.

FIG. 7 depicts an example of the procedure by which all possible new legs using the netting groups are found. For each netting group, the legs are combined by addition and subtraction to create new legs, so long as the new leg is free of gaps, i.e., continuous. In the example of FIG. 7, one combination is shown, namely a leg A is subtracted from a leg B to create leg NEW.

FIG. 7 also depicts an example of how some combinations are not used because the result of the combination includes a gap. In this example, a leg C cannot be combined with either the leg A or the leg B to create a new leg without gaps. If you subtract the leg A from the leg C, the result includes a portion 702 of the leg C and also a portion 704 of the leg A. The portions 702, 704 would be separated by a gap in a time period 706. The gap means that the combination is not continuous and, thus, not used in the creation of possible new trades.

One reason for not using combinations that have gaps involves valuation. For instance, the mark-to-market and risk information for the entire leg A may be submitted by a party, but how such valuation data is distributed between the portions of the leg A is not known (e.g., not provided by the party). The leg C is therefore not utilized in definition of new possible legs. In contrast, when creating the leg NEW, the mark-to-market and risk information for the leg NEW can be derived from the information provided for the entire leg A and the entire leg B.

Figure 8:
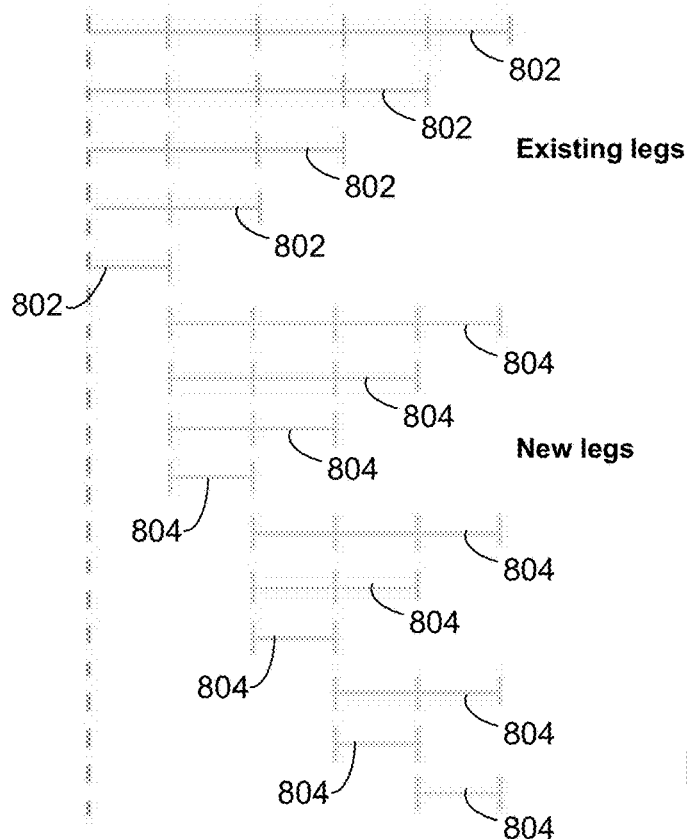

FIG. 8 depicts an example of finding (or identifying) all unique legs that are capable of being created by combining legs 802 of existing trades. In this case, the legs 802 are five spot legs. The legs 802 are combined to create ten new possible legs 804. Each of the ten new possible legs 804 is continuous.

Now that the new legs have been created for each netting group, possible new trades involving the netting groups (e.g., pairs of netting groups) may be created. But only some of the pairs of netting groups may be valid types of trades. As described above, a determination of which trades, or netting group combinations, are valid may be made. In other cases, the valid combinations are predetermined or otherwise known. A valid combination may be one that is allowed or permitted by a CCP or exchange. The combinations deemed to be valid may, for example, constitute all existing trades in a portfolio, or all trades that a CCP allows to be created.

In some cases, each netting combination involves two primary, or core, groups. In IRS examples, the combination may involve one float primary group and one fixed primary group. One example netting combination may be the most standard fixed primary group combined with the most standard three-month (3M) float primary group. Another example netting combination may then be the same fixed primary group combined with the most standard six-month (6M) float primary group. The valid netting group combinations are then used to find possible netting group combinations given the netting groups previously created. In other cases, a valid combination may involve more than two netting groups.

Figure 9:
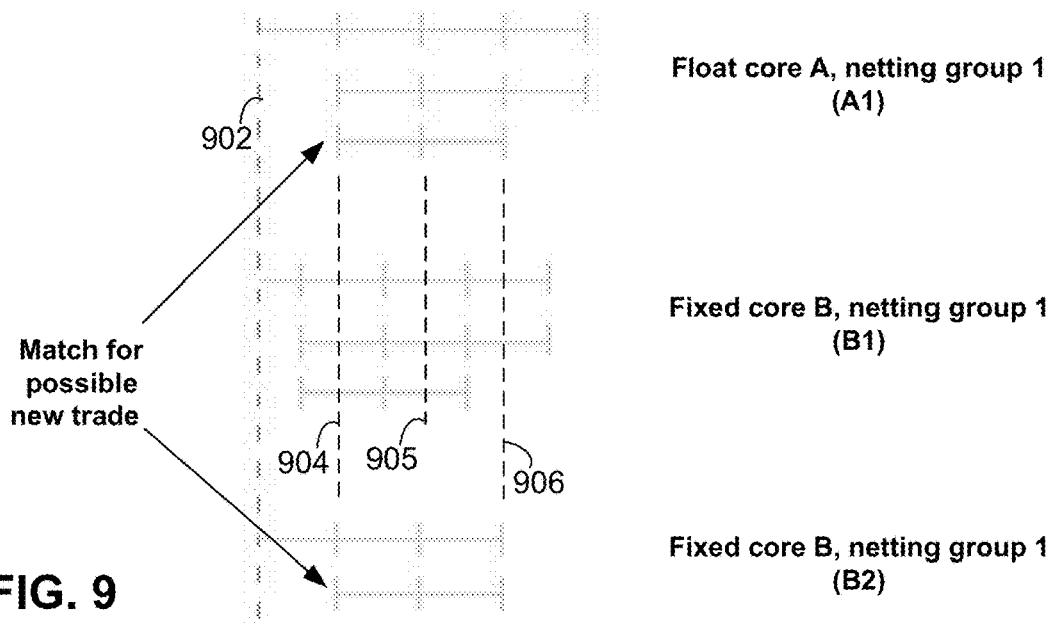
FIG. 9 depicts the definition of a new data object from continuous data streams by the disclosed methods and systems in accordance with one example.

FIG. 9 depicts an example of the manner in which the netting combinations (e.g., trades) that are possible to create are found or identified. For each netting combination, all netting groups of one side of the combination are analyzed against all netting groups of the other side of the combination. Wherever matching start and end dates and otherwise aligned timings are found between one leg from each side of the combination, a new valid trade to create has been found.

In the example of FIG. 9, a valid combination of netting groups has been found to exist between a float core (or primary) group A and a fixed core group B. For instance, the CCP may allow trades that involve a combination of legs from the float core group A and legs from the fixed core group B. In this example, the fixed core group B has two netting groups, namely netting group B1 and netting group B2. The float core group A only includes a single netting group A1. Although similar legs are found in the netting groups A1 and B1, the cash flow dates are not aligned, as indicated by dashed line 902. As a result, no new possible trades can stem from the combination of the netting groups A1 and B1. The netting group B2, on the other hand, presents a perfect start and end date match for a leg in group A1, as indicated by dashed lines 904-906. A possible new trade can thus be created from the combination of the netting groups A1 and B2.

Figure 10:
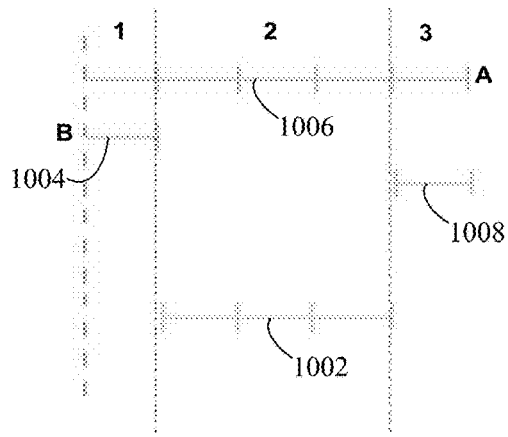
FIG. 10 depicts a magnitude determination for a new data object based on the set of data objects by the disclosed methods and systems in accordance with one example.

FIG. 10 depicts an example of the manner in which a new trade involving leg 1002 may be valued using data from legs 1004, 1006, 1008 of existing trades. In this example, the new leg 1002 is created via a combination involving subtracting the legs 1004, 1008 from the leg 1006. After the new trade 1002 has been determined to be used by the linear optimization, it is known what nominal and fixed rate it should have. The valuation of FIG. 10 involves the magnitudes of other parameters, such as cash flow amounts, delta, mark-to-market, and other items calculated at the CCP or the parties (e.g., banks). The nominal and fixed rate may be used as inputs to the valuation of FIG. 10 so that the contribution from the existing trades may be determined, as described herein. For example, if the legs 1004, 1006, 1008 of the existing trades were are all fixed legs of 1M at 1%, and the new leg 1002 is determined via the optimization to be a fixed leg of 2M at 1%, then the valuation of the new leg 1002 may be calculated as follows: (Valuation$_{1006}$−Valuation$_{1004}$−Valuation$_{1008}$)*2.

This aspect of the disclosed methods and systems values and adds the risk presented by the new trades exactly as if the valuation was calculated by the party holding positions via the existing trades. For a risk-free application like coupon blending, this may not be necessary but, if per leg data is available, it can still be used to verify the process and the consistency of client valuations. If there is an inconsistency at a client, so that for example risk is not flat after a refactoring exercise, this inconsistency may be reported to the party.

For all existing legs in a netting group, the disclosed methods and systems determine over which time spans they could be used to determine valuation. In FIG. 10, the leg 1006 contributes to time spans 1, 2 and 3. The leg 1004 contributes to the time span 1 and the leg 1008 contributes to the time span 3. The new leg 1002 of the new trade needs to be isolated the time span 2. It is then determined which legs to use and which legs to value in the entire process. For instance, the determination may involve or include an optimization that finds the solution, from many (e.g., infinite) possible solutions, that uses the lowest magnitude for one or more variables. The optimization may include a linear optimization, such as commercially available linear optimization products. In the example of FIG. 10, if all of the depicted legs are float payers and have the same notional, the solution for leg NEW is to subtract legs B and C from leg A.

The number of new legs and, thus, trades, that can be used and valued may be substantial. For instance, the number of new legs grows in a quadratic manner or fashion with the number of unique legs in a netting group since the number of dates which can be combined grows linearly with legs, and for each netting group new legs can be created from all dates to all dates if the start date of a leg is before the end date. The exact number of new trades for a netting group will also vary with the composition of forward starting legs and spots since all legs will not necessarily contribute with new information but can be a linear combination of other existing legs. If it is assumed that all legs of a kind, float legs for example, of a portfolio belong to the same core group, are unique spot legs, have a pay period of 3M and are evenly distributed in terms of roll dates, there will be 90 netting groups in the portfolio. If legs are manually selected not to be in the same netting group it is possible to add 90 legs, the number of unique days in 3M, to the portfolio without creating a netting group with two trades. The 91st leg cannot be added without creating an overlap with one other leg so the 90 is the known cap for 3M rolling. For 6M rolling the cap will be 180 groups following the same reasoning. With these assumptions and the fact that both payer and receiver legs can be created, the number of potential new legs/trades that can be valued for the portfolio increases. These new trades may then, for example, be used in multilateral notional compression with perfect compliance with client risk tolerances.

Figure 11:
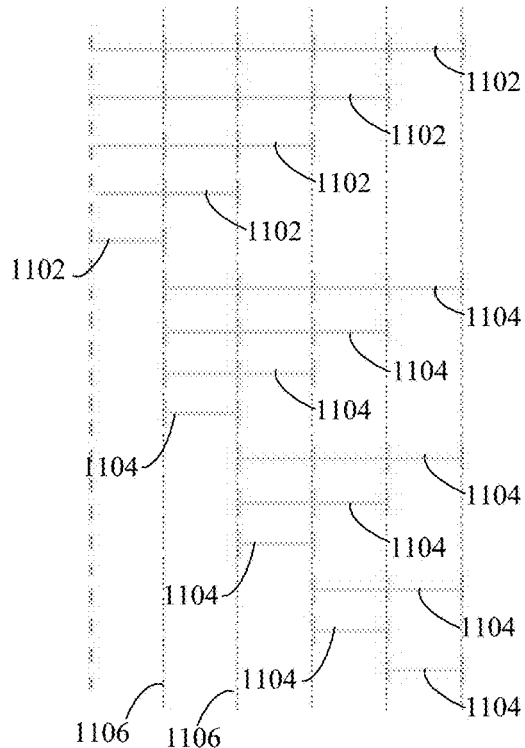
FIG. 11 depicts netting group time span constraints used by the disclosed methods and systems in accordance with one example.

FIG. 11 shows an example of a set of existing legs 1102 and new legs 1104 in a netting group. Complementing the existing legs 1102 with the new legs 1104 significantly increases the number of degrees of freedom for the optimization. For each netting group, the optimization may be configured with time span constraints to ensure that each time span stays risk neutral. The space between each vertical dashed line 1106 corresponds with a time span that, in some cases (e.g., unilateral compression cases) needs to stay flat, or risk neutral, and thus represent a constraint in the model.

All of the existing trades and new trades will then contribute to the time span constraints of the two legs, one fixed and one float leg, which are connected to the trade. In other words, all trades will be the variables in the optimization model where both notional and fixed rate of the trades can change. In this manner, the new trades can connect different fixed and float core groups.

Figure 12:
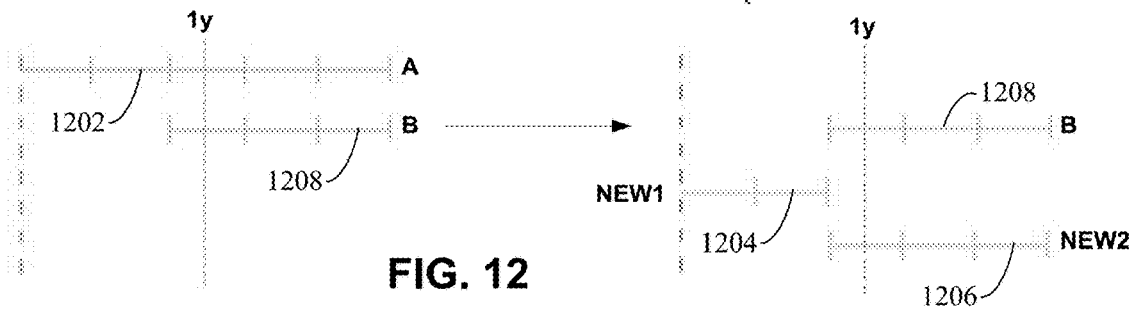
FIG. 12 depicts generation of new data objects in connection with an application by the disclosed methods and systems in accordance with one example involving the Standardized Approach for Measuring Counterparty Credit Risk Exposures (SA-CCR).

FIG. 12 depicts an example application involving Standardized Approach for Measuring Counterparty Credit Risk Exposures (SA-CCR) optimization. In SA-CCR trading regimes, instead of calculating a capital charge based on gross notional, the capital charge is based on net notional. The net notional is determined for a number of time periods. For example, time periods may be established for zero-to one year, between one year and five years, and greater than five years. Each trade contributes with a number relative to its length and the contribution is in the time period of the end date. The SA-CCR weight of a trade is attributed to the SA-CCR time period in which the end date falls, and is proportionate to the length of the trade. It is thus possible to change where a trade contributes by splitting it up so that it has end dates in multiple time periods. Multilateral SA-CCR optimization may thus be easier than unilateral SA-CCR optimization because risk and positions between counterparties may be moved in a multilateral landscape without affecting the market risk presented by the positions. In optimization with one counterparty, for example unlinked CCP portfolio compression or risk-free netting/coupon blending, SA-CCR may be optimized by changing the composition and relation between spot and forward starting swaps. SA-CCR charges can thus be manipulated using the refactoring combinations described herein to, for instance, either split a spot swap into a short spot swap and a forward starting swap, or merge a spot swap and a forward starting swap into a long spot.

In the example of FIG. 12, a leg 1202 of a long spot swap A is split into new legs 1204 and 1206, where the new leg 1204 is created by subtracting existing leg 1208 from the leg 1202. Before the split, all of the SA-CCR weight of the trade involving the leg 1202 was attributed to the time period after one year. After the split, some of the weight of the trade involving the leg 1202 is attributed to the time period before one year. Moving the weight of the trade is directed to lowering the capital charge associated with the net notional for each SA-CCR time period (e.g., 0-1 year, between 1-5 years, greater than five years). For example, if the sign of the net notional values in the two of the time periods are opposite, the net notional values may be modified in opposite directions by adding trades as in the example of FIG. 12. For instance, a long trade would shift the long time period (e.g., greater than five years) in one direction, and a shorter spot would shift the first time period (e.g., 0-1 year) in the other direction. A short forward trade would also shift the longer bucket in that direction, but because the forward trade is shorter (but has the same end date as the long spot trade), the short forward trade would not contribute as much as the long spot trade due to how SA-CCR is calculated. By shifting between the time periods, the SA-CCR optimization may thus result in a lowering of the magnitudes in each time period (e.g., less negative in one time period, and less positive in another time period).

In unlinked portfolio compression the disclosed methods and systems can be used to value and inject new trades for parties where spot or forward starting swaps could be beneficial to SA-CCR optimization without asking clients for more data, for example if certain parts of a portfolio are missing useful forward starters to achieve splits or rearrangement of composition.

In SA-CCR risk-free netting and other coupon blending scenarios, new trades are again injected where possible to increase degrees of freedom. Before running the optimization to represent the portfolio efficiently with fewer cash flows, an optimization is performed to minimize SA-CCR by rearranging the composition of spot and forward swaps. These new levels of total SA-CCR contributions are then locked-in before the traditional risk-free netting/coupon blending compresses the portfolio.

Figure 13:
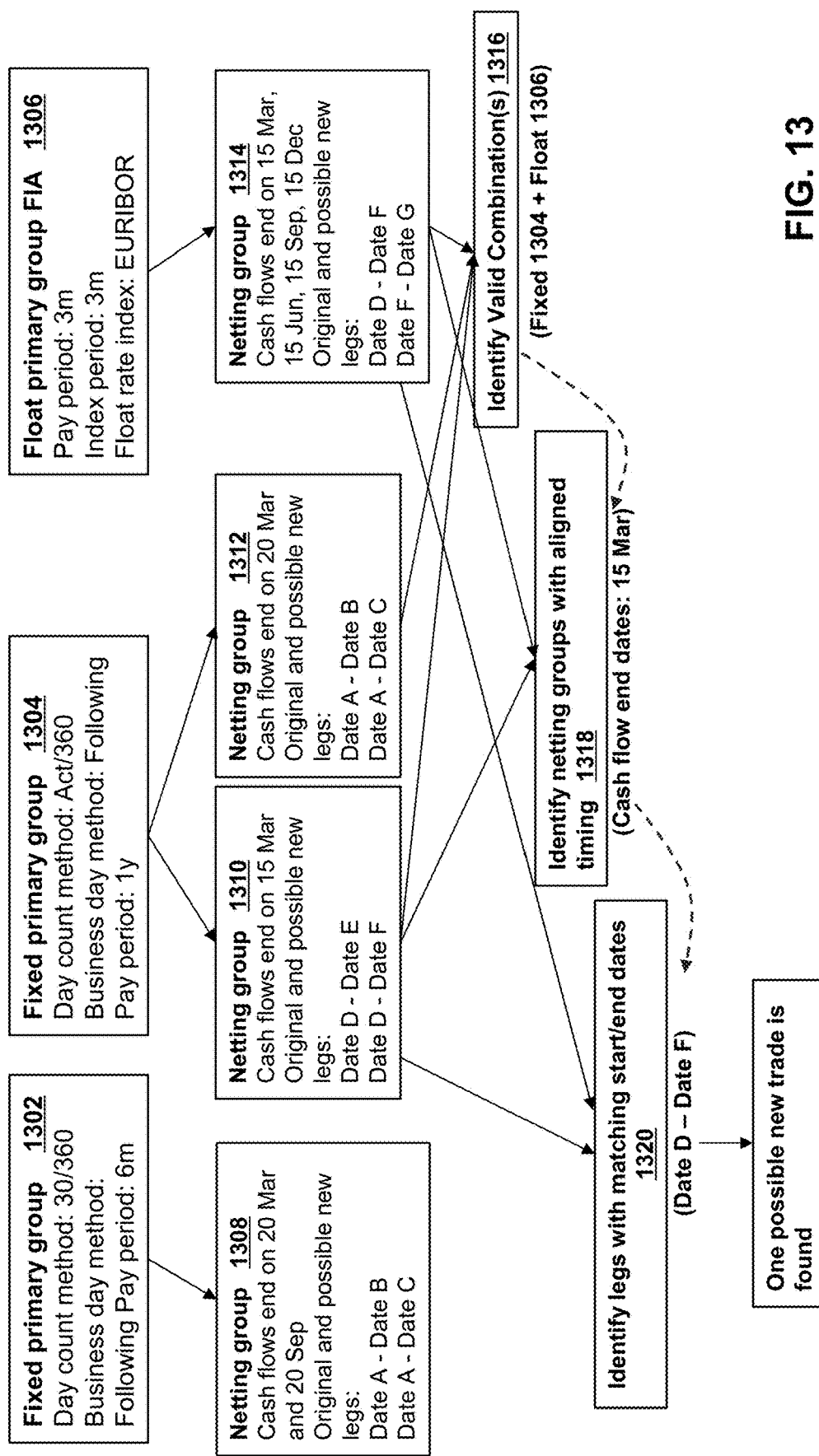
FIG. 13 depicts an application of the disclosed methods and systems to define a plurality of new data objects for adjustment of a set of data objects in accordance with one example.
Figure 17:
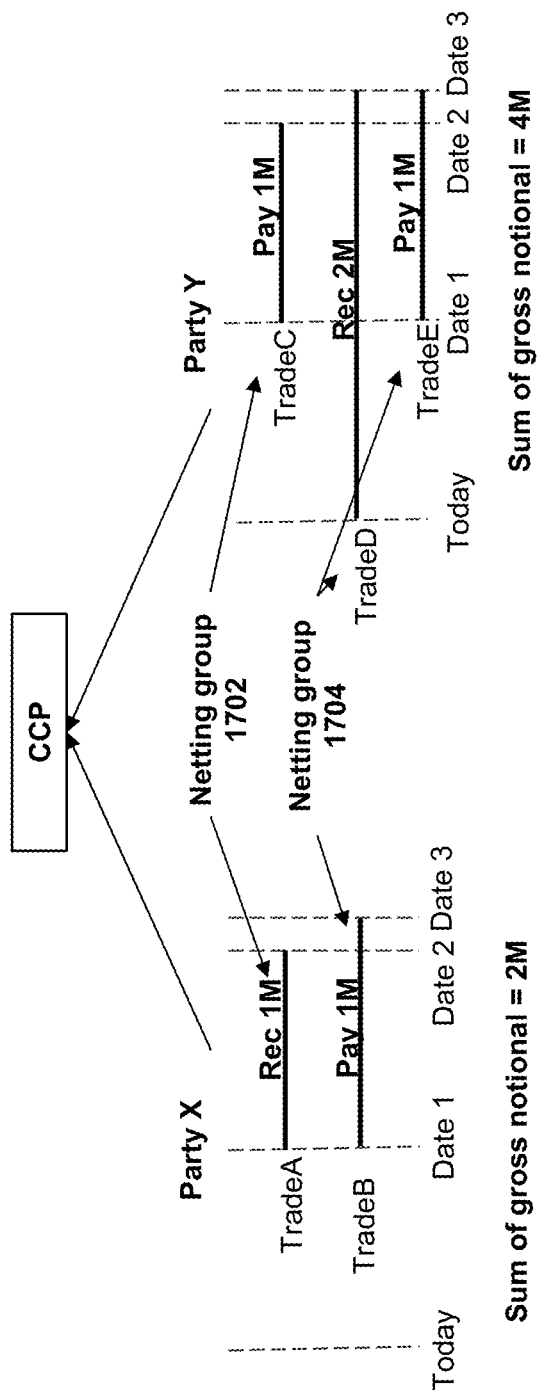
FIG. 17 depicts a multilateral application of the disclosed methods and systems to define a plurality of new data objects for adjustment of a set of data objects in accordance with one example involving multiple sources of data objects and a central controller of the set of data objects.
Figure 18:
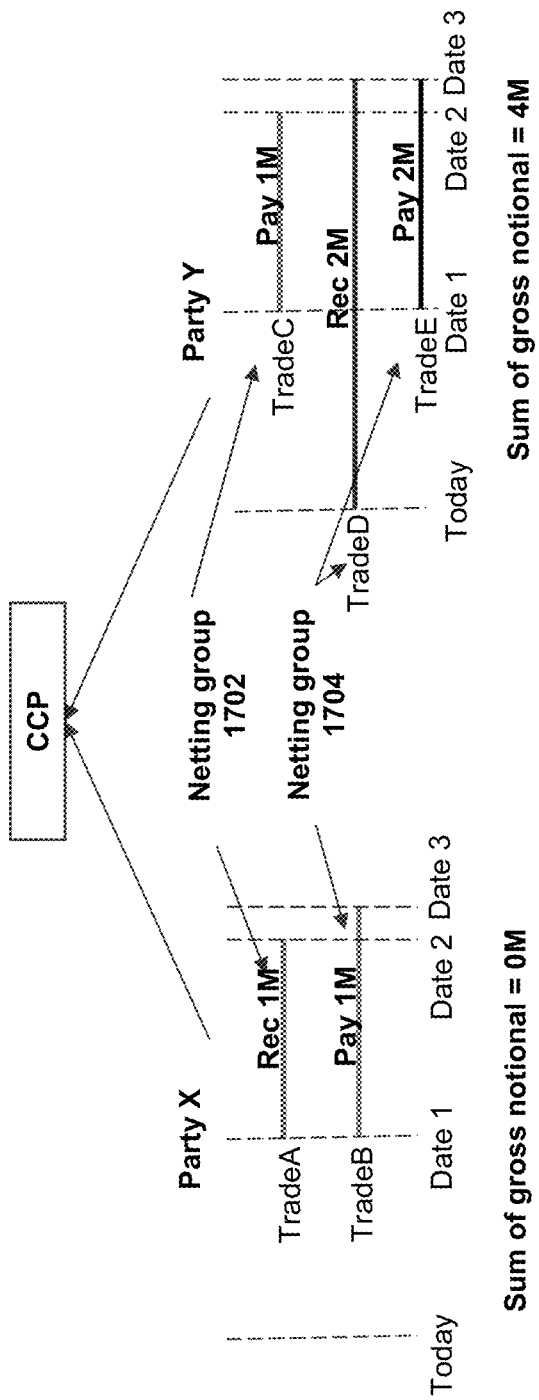
FIG. 18 depicts an adjustment of the set of data objects shown in FIG. 17 without the additional degrees of freedom provided via the processing of the disclosed methods and systems.
Figure 19:
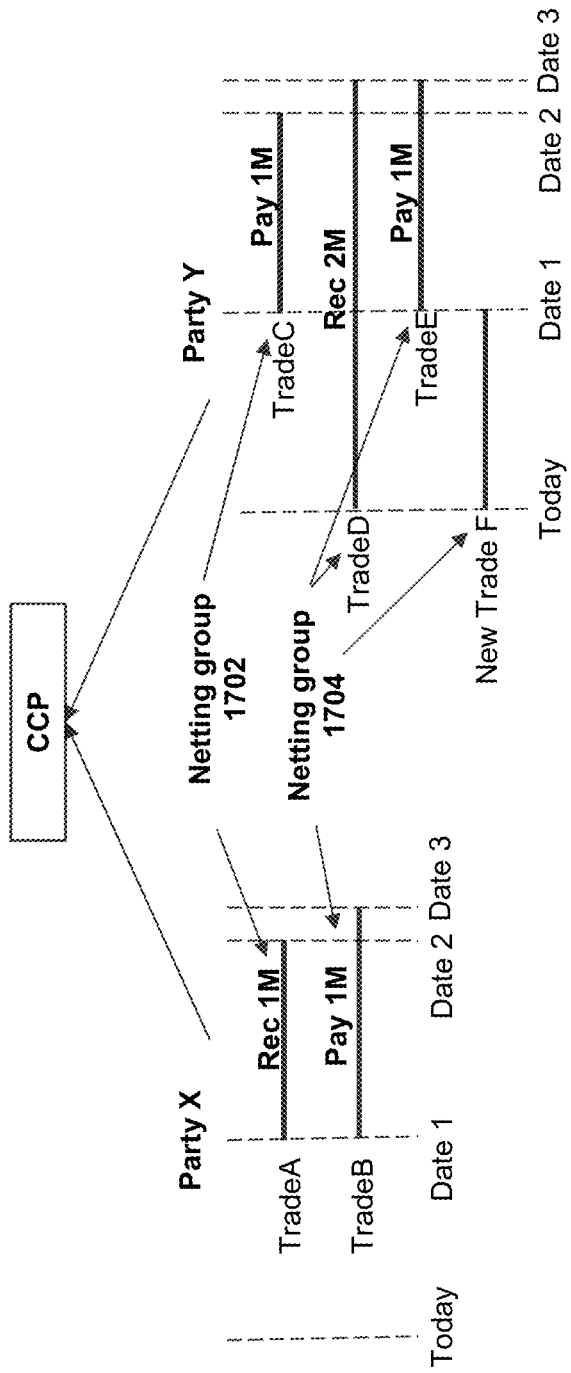
FIG. 19 depicts the definition and selection of a new data object by the disclosed methods and systems for adjustment of the set of data objects shown in FIG. 17.
Figure 20:
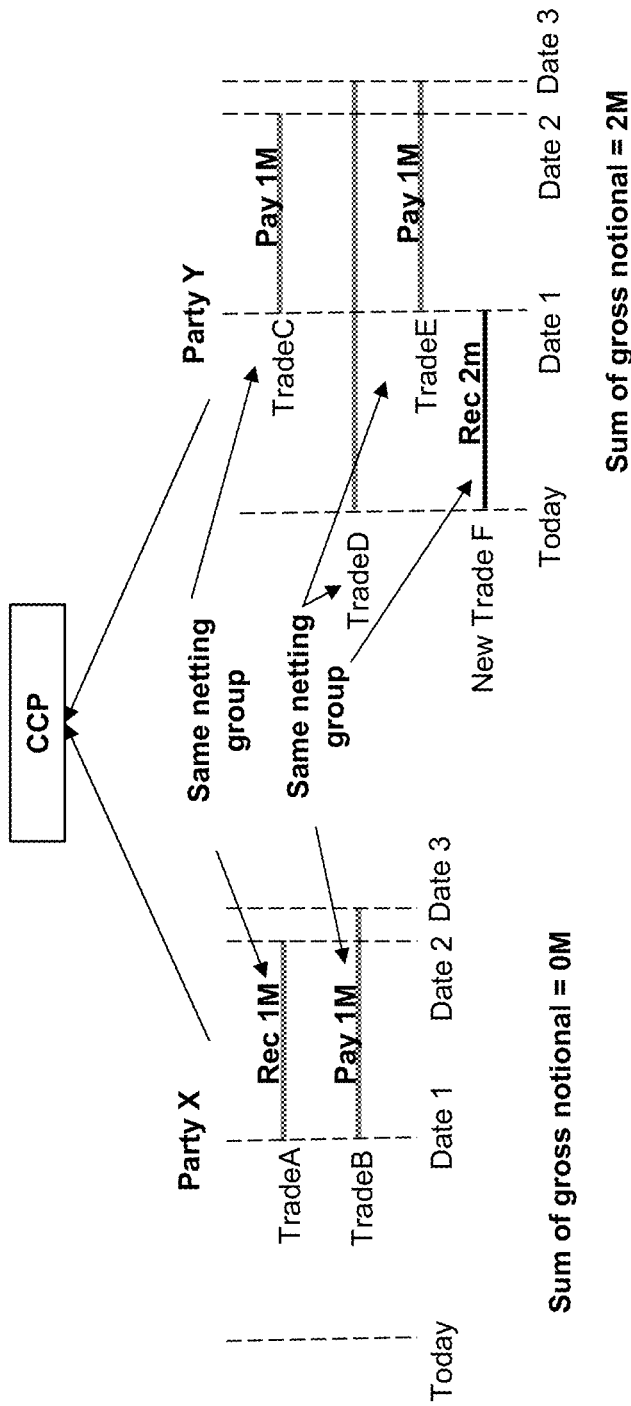
FIG. 20 depicts the adjustment of the set of data objects of FIG. 17 by the disclosed methods and systems in accordance with the new data object of FIG. 19.

FIGS. 13-20 illustrate further examples of the application of the disclosed methods and systems to sets of data objects. FIG. 13 depicts the definition of new possible trades for various types of compressions. FIG. 14-16 depict an example involving coupon blending or other unilateral compression. FIGS. 17, 19, and 20 depict an example involving multilateral compression. FIG. 18 depicts how a compression vendor may attempt to process the set of data objects shown in FIG. 17 without the use of the disclosed methods and systems. As previously described, unilateral compression includes or involves reduction of the gross notional of a single party's portfolio in a risk neutral manner. Multilateral compression includes or involves reduction of the gross notional across multiple parties within specified risk constraints, while keeping the CCP cash flow neutral.

FIG. 13 depicts a unilateral compression of a set of data objects by the disclosed methods and systems in accordance with one example. For instance, the compression may be directed to coupon blending of a bank portfolio of interest rate swaps. For ease in description, the portfolio is simplified to present only two fixed primary (or core) groups 1302, 1304, and one float primary group 1306. The primary groups 1302, 1304 are defined via day count methodology, business day methodology, and pay period, as shown. Any number of additional or alternative properties may be involved. Using the properties, the legs of the positions in the portfolio are analyzed to allocate each leg to one of the primary groups. In this example, legs having the day count methodology, business day methodology, and pay period in common are allocated to the same primary group.

Within each primary group, each leg is then assigned to a respective netting group. The size and complexity of the set of data objects in this example has been greatly simplified for ease in description. In this example, the fixed primary group 1302 includes a single netting group 1308, in which all legs in the fixed primary group 1302 with cash flows ending on March $20^{th}$ and September 20' are assigned. Due to the simplicity of the example, all of the legs in the fixed primary group 1302 have such cash flows. In a more complex example, the fixed primary group 1302 may have one or more legs that have different cash flow end dates, in which case such legs would be assigned to another netting group within the fixed primary group 1302.

The legs of the fixed primary group 1304 are assigned to two netting groups 1310 and 1312. The fixed primary group 1304 includes the two netting groups 1310, 1312 because the portfolio includes legs that have cash flows that end on different dates of the month (March $15^{th}$ and March $20^{th}$). The legs are thus not aligned. However, once assigned to the respective netting groups 1310, 1312, the legs within a respective netting group have aligned timing. In contrast, all of the legs of the float primary group 1306 are capable of being assigned to a single netting group 1314.

Within each of the netting groups 1308, 1310, 1312, 1314, a plurality of continuous legs (or other continuous data streams) are generated by combining the legs therewithin. FIG. 13 shows the existing and possible new legs within each netting group by the start and end dates thereof. For instance, the netting group 1312 has, after the combinations, existing and possible new legs that start on date A and end on date B, as well existing and possible new legs that start on date A and end on date C. The new legs may be referred to herein as "possible" new legs because it remains to be determined whether the new legs will be used to create new trades for use in the optimization.

After the new possible legs are generated, one or more valid combinations of a pair of the primary (or core) groups are identified in a block 1316. In this simplified example, only one pair is identified, namely the fixed group 1304 and the floating group 1306. For that pair of primary groups, the netting groups having aligned timing are identified in a block 1318. In this example, the netting groups 1310 and 1314 are aligned due to a common cash flow date of March $15^{th}$.

Within those aligned netting groups 1310, 1314, the legs having aligned or matching start and end dates are identified in a block 1320. In this example, each netting group 1310, 1314 has a leg that starts on Date D and ends on Date F. Those two legs are then used to define a new possible trade. That new possible trade, and any others defined via the above-described process, are then available for use in the optimization.

FIG. 14 depicts an example portfolio having trades A, B, C, and D. For ease in description, the portfolio includes only one combination of primary groups, and all of the trades have aligned timing, e.g., aligned cash flows. As a result, the analysis of the portfolio only yields one fixed netting group and one float netting group for the entire portfolio that can be combined.

Each of trades A-D involves two legs—one fixed cash stream and one float cash stream. The trades are paying one, and receiving the other. For example, for trade A, the position is paying the float leg, and receiving a fixed leg of 5 million (M) at a fixed rate of 4%.

FIG. 14 also depicts the specifics of each trade to provide a simplified example of a coupon blending scenario. The four trades A-D present a total gross notional amount of 16M. At each of four time segments (or sections) 1-4, the portfolio presents the net positions shown. The optimization is thus directed to minimizing the gross notional while keeping the net positions flat, i.e., without changing the net position at each time section.

Two or more of the trades may offset one another if the time spans of the trades overlap. For example, trades A and B overlap in time segment 1. The trades A and B, in fact, cancel each other exactly during time segment 1, as the trades A and B are equal and are opposite in direction (i.e., polarity).

Time segment 2 in FIG. 14 depicts an example of the manner in which the net position on the fixed side is calculated for a respective time segment. In time segment 2, the trade B contributes a pay position of 5M at 4%, while the trade D contributes a receive position of 3M at 5%. The net fixed position is therefore 5M×4 (or 20M) of pay minus 3M×5 (or 15 m) of receive, which equals a net pay of 5M.

The net positions of each time segment 1-4 are used as constraints on the optimization. The optimization for coupon blending is thus configured to maintain the net positions at each time segment while attempting to minimize the gross notional.

FIG. 15 depicts the existing (or original) trades A-D from FIG. 14 in connection with the generation of possible new trades to add at any notional amount (or magnitude) and fixed rate. The possible new trades include all of the possible additions and subtractions of the existing trades. For instance, starting from the top and working down, the first possible new trade is generated via the addition of the trades B and C. The second possible new trade is generated via the addition of the trades A and D. The third possible new trade is generated by subtracting the trade A from the trade B.

All of the possible new trades and the existing trades are input or otherwise provided to the linear optimization of the disclosed methods and systems, as described above. The linear optimization is implemented to determine the combination of the existing trades and a selection of the new possible trades that results in the optimal adjustment to the portfolio. The optimal adjustment is one that recreates the same net positions (e.g., at each time segment) with the minimal gross notional amount.

FIG. 16 depicts two of the possible new trades, new trades E and F, that are selected via the optimization to achieve the optimal amount of gross notional for the example of FIGS. 14 and 15. Trade E was generated via the subtraction of the trade A from the trade B. Trade F was generated via the following combination: A+D−C−B.

The parameters of the trades E and F are determined in the optimization to offset one or more existing trades. For example, the notional of the trade is scaled to a level so that the float cash flows are equal to the original net float cash flows. The fixed rate is then selected so that the combination of trade notional and fixed rate of the fixed leg makes the fixed cash flows equal to the original net fixed cash flows. In this example, the trade E is configured as a trade receiving a 2M float leg, and paying a 2M fixed leg at 2.5%. The trade F is configured as a trade paying a 3M float leg, and receiving a 3M fixed leg at 5%.

FIG. 17 depicts an example of a multilateral compression with two parties X and Y in a cash flow neutral CCP and trades of 1% fixed rate and dealing with one valid primary combination. The portfolios involved in the multilateral compression are further simplified to include only two netting groups 1702, 1704 for ease in description.

FIG. 18 depicts a prior art approach to the multilateral compression of the portfolio of FIG. 17 that could be performed without the refactoring of the legs of the portfolios in accordance with the disclosed methods and systems. Without the refactoring, the best multilateral result involves terminating Trade A and Trade C against each other. Trade B is also terminated, thereby making Party X risk-flat. Trade E is doubled to make the CCP cash flow neutral and to make Party Y risk-flat in the last time section. But as shown in FIG. 18, party B is left with a gross notional of 4M. As explained in connection with FIGS. 19 and 20, the inability to add degrees of freedom to the optimization in FIG. 18 leaves party B without any compression. The prior art compression technique thus fails to achieve any technical benefit associated with such compression (e.g., lower data storage, lower processor usage, lower communications requirements, etc.).

FIG. 19 depicts the setup of the multilateral compression of the portfolio of FIG. 17 when possible new trades are available for offsetting and, thus, incorporated into the optimization. A new trade F in the netting group 1704 is generated for party Y by subtracting the trade E from the trade D, as described herein, with a time span extending between a start date of today and ending on a date 1.

FIG. 20 depicts the implementation of the multilateral compression with the new trade F of FIG. 19 incorporated therein. With the new trade, the trades A and C are terminated against each other. The trades B and E are terminated against the last section of Trade D, making the CCP cash flow neutral, as well as Party X and Party Y risk-flat in that section. The new trade F is created to make the CCP cash flow neutral and to make Party Y risk-flat in the first section. As a result of incorporating the New Trade F, party X has a gross notional of zero (as in FIG. 18), and party Y has a gross notional of 2M (lower than the 4M in FIG. 18), and the CCP remains risk flat. The incorporation of the new trade F may also be subject to verification that Party Y remains within its risk constraints, as described herein.

The incorporation of the new trade F by the methods and systems is also useful in connection with the trade valuation-related data processing. For instance, the disclosed methods and systems reduce the need for a compression vendor to send the new trade F (and any other new trades) to clients for valuation, and the need for clients to parse such data. As a result, processor usage at clients and/or the vendor for valuation and risk calculations of new trades is reduced or eliminated. As a further result, network bandwidth usage for trade data between clients and the vendor is also reduced.

The above-described methods and systems are useful in connection with coupon blending-related data processing. For instance, the disclosed methods and systems reduce capital charges for clients by increased efficiency, and reduce the number of cash flow records needed to represent a portfolio, as described herein.

The above-described methods and systems are useful in connection with SA-CCR optimization. For instance, the disclosed methods and systems create degrees of freedom to enable new SA-CCR optimization opportunities, as described herein.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system for processing a set of data objects, each data object specifying a plurality of constituent data streams, the system comprising:
   a processor;
   a memory coupled with the processor;
   first logic stored in the memory and executable by the processor to cause the processor to obtain the plurality of constituent data streams for each data object of the set of data objects;
   second logic stored in the memory and executable by the processor to cause the processor to analyze the plurality of constituent data streams to allocate each constituent data stream to one of a set of primary groups, the constituent data streams in each primary group of the set of primary groups having a common set of properties;
   third logic stored in the memory and executable by the processor to cause the processor to assign the constituent data streams within each primary group of the set of primary groups having aligned timing to a netting group of the primary group;
   fourth logic stored in the memory and executable by the processor to cause the processor to generate, for each netting group of each primary group of the set of primary groups, a plurality of continuous data streams by combining two or more of the constituent data streams within the netting groups;
   fifth logic stored in the memory and executable by the processor to cause the processor to define a plurality of new data objects from the generated plurality of continuous data streams, each new data object of the plurality of new data objects specifying a plurality of continuous data streams associated with a pair of primary groups of the set of primary groups;
   sixth logic stored in the memory and executable by the processor to cause the processor to incorporate at least one new data object of the plurality of new data objects into the set of data objects to effectuate adjustments to the set of data objects; and
   seventh logic stored in the memory and executable by the processor to cause the processor to store the adjustments to the set of data objects.

2. The system of claim 1, further comprising eighth logic stored in the memory and executable by the processor to cause the processor to select the at least one new data object from the defined plurality of new data objects to offset at least one data object of the set of data objects.

3. The system of claim 2, wherein execution of the eighth logic further causes the processor to configure the at least one new data object by scaling a magnitude property in accordance with the at least one data object.

4. The system of claim 2, wherein execution of the eighth logic further causes the processor to implement a linear optimization of the set of data objects and the defined plurality of new data objects, the linear optimization being configured to minimize a total magnitude presented by the set of data objects after the adjustments, while satisfying one or more constraints on the linear optimization.

5. The system of claim 4, wherein:
   each constituent data stream of the plurality of constituent data streams has a length that spans one or more time periods; and
   the linear optimization is configured to maintain a net magnitude of the set of data objects for each time period across which the plurality of constituent data streams span.

6. The system of claim 4, wherein the linear optimization is configured with a constraint on the adjustments for a tolerance level for fluctuation of a respective net magnitude of a subset of the set of data objects for each time period across which the plurality of constituent data streams span.

7. The system of claim 6, wherein:
   each constituent data stream of the plurality of constituent data streams has a length that spans one or more time periods; and
   the linear optimization is further configured with a constraint on the adjustments that a net magnitude of an entirety of the set of data objects remains constant for each time period across which the plurality of constituent data streams span.

8. The system of claim 1, wherein execution of the fifth logic further causes the processor to determine which netting groups of the pair of primary groups have constituent data streams with aligned timing.

9. The system of claim 8, wherein:
   each constituent data stream of the plurality of constituent data streams extends from a start timing to an end timing; and
   execution of the fifth logic further causes the processor to identify, for each pair of primary groups, the constituent data streams and the generated continuous data streams within the determined netting groups having start timing in common and having end timing in common.

10. The system of claim 1, wherein each respective pair of primary groups corresponds with one of a set of predetermined types of the set of data objects.

11. The system of claim 1, wherein each constituent data stream has a start timing, an end timing, and an event timing.

12. The system of claim 1, wherein the common set of properties comprises one or more timing properties and a rate type property.

13. The system of claim 1, wherein execution of the fourth logic further causes the processor to add the two or more constituent data streams.

14. The system of claim 1, wherein execution of the fourth logic further causes the processor to subtract one of the two or more constituent data streams from another of the two or more constituent data streams.

15. The system of claim 1, wherein:
each constituent data stream comprises one or more segments; and
generating the plurality of continuous data streams comprises combining the two or more of the constituent data streams on a segment-by-segment basis.

16. The system of claim 1, wherein each data object of the set of data objects comprises data representative of a trade involving an exchange of cash flows, such that each constituent data stream of the plurality of constituent data streams is representative of a leg of the exchange of cash flows.

17. A computer-implemented method for processing a set of data objects, each data object specifying a plurality of constituent data streams, the method comprising:
obtaining, by a processor, the plurality of constituent data streams for each data object of the set of data objects;
analyzing, by the processor, the plurality of constituent data streams to allocate each constituent data stream to one of a set of primary groups, the constituent data streams in each primary group of the set of primary groups having a common set of properties;
assigning, by the processor, the constituent data streams within each primary group of the set of primary groups having aligned timing to a netting group of the primary group;
generating, by the processor, for each netting group of each primary group of the set of primary groups, a plurality of continuous data streams by combining two or more of the constituent data streams within the netting groups;
defining, by the processor, a plurality of new data objects from the generated plurality of continuous data streams, each new data object of the plurality of new data objects specifying a plurality of continuous data streams associated with a pair of primary groups of the set of primary groups;
implementing, by the processor, an optimization of the set of data objects and the defined plurality of new data objects to select at least one new data object from the defined plurality of new data objects to offset at least one data object of the set of data objects;
incorporating, by the processor, the at least one new data object of the plurality of new data objects into the set of data objects to effectuate adjustments to the set of data objects; and
storing, by the processor, in a memory, the adjustments to the set of data objects.

18. The computer-implemented method of claim 17, wherein the optimization comprises a linear optimization, the linear optimization being configured to minimize a total magnitude presented by the set of data objects after the adjustments, while satisfying one or more constraints on the linear optimization.

19. The computer-implemented method of claim 17, wherein implementing the optimization comprises configuring the at least one new data object by scaling a magnitude property in accordance with the at least one data object.

20. The computer-implemented method of claim 17, wherein the optimization is configured to maintain a net magnitude of the set of data objects for each time period across which the plurality of constituent data streams span.

21. The computer-implemented method of claim 17, wherein the optimization is configured with a constraint on the adjustments for a tolerance level for fluctuation of a net magnitude of a subset of the set of data objects for each time period across which the plurality of constituent data streams span.

22. The computer-implemented method of claim 21, wherein:
each constituent data stream of the plurality of constituent data streams has a length that spans one or more time periods; and
the optimization is further configured with a constraint on the adjustments that a respective net magnitude of an entirety of the set of data objects remains constant for each time period across which the plurality of constituent data streams span.

23. The computer-implemented method of claim 17, wherein defining the plurality of new data objects comprises determining which netting groups of the respective pair of primary groups have constituent data streams with aligned timing.

24. The computer-implemented method of claim 23, wherein:
each constituent data stream of the plurality of constituent data streams extends from a start timing to an end timing; and
defining the plurality of new data objects comprises identifying, for each respective pair of primary groups, the constituent data streams and the generated continuous data streams within the determined netting groups having start timing in common and having end timing in common.

25. The computer-implemented method of claim 17, wherein generating the plurality of continuous data streams comprises adding the two or more of the constituent data streams.

26. The computer-implemented method of claim 17, wherein generating the plurality of continuous data streams comprises subtracting one of the two or more constituent data streams from another of the two or more constituent data streams.

27. The computer-implemented method of claim 17, wherein:
each constituent data stream comprises one or more segments; and
generating the plurality of continuous data streams comprises combining the two or more of the constituent data streams on a segment-by-segment basis.

28. A computer program product for processing a set of data objects, each data object specifying a plurality of constituent data streams, the computer program product comprising one or more non-transitory computer-readable storage media having stored thereon computer-executable instructions that, when executed by one or more processors of a computing system, cause the computing system to perform a method, the method comprising:

obtaining the plurality of constituent data streams for each data object of the set of data objects;

analyzing the plurality of constituent data streams to allocate each constituent data stream to one of a set of primary groups, the constituent data streams in each primary group of the set of primary groups having a common set of properties;

assigning the constituent data streams within each primary group of the set of primary groups having aligned timing to a netting group of the primary group;

generating for each netting group of each primary group of the set of primary groups, a plurality of continuous data streams by combining two or more of the constituent data streams within the netting groups;

defining a plurality of new data objects from the generated plurality of continuous data streams, each new data object of the plurality of new data objects specifying a plurality of continuous data streams associated with a pair of primary groups of the set of primary groups;

implementing a linear optimization of the set of data objects and the defined plurality of new data objects to select at least one new data object from the defined plurality of new data objects to offset at least one data object of the set of data objects;

incorporating the at least one new data object of the plurality of new data objects into the set of data objects to effectuate adjustments to the set of data objects; and storing the adjustments to the set of data objects.

29. The computer program product of claim 28, wherein the linear optimization is configured to minimize a total magnitude presented by the set of data objects after the adjustments, while satisfying one or more constraints on the linear optimization.

30. A system for processing a set of data objects, each data object specifying a plurality of constituent data streams, the system comprising:

means for obtaining the plurality of constituent data streams for each data object of the set of data objects;

means for analyzing the plurality of constituent data streams to allocate each constituent data stream to one of a set of primary groups, the constituent data streams in each primary group of the set of primary groups having a common set of properties;

means for assigning the constituent data streams within each primary group of the set of primary groups having aligned timing to a netting group of the primary group;

means for generating for each netting group of each primary group of the set of primary groups, a plurality of continuous data streams by combining two or more of the constituent data streams within the netting groups;

means for defining a plurality of new data objects from the generated plurality of continuous data streams, each new data object of the plurality of new data objects specifying a plurality of continuous data streams associated with a pair of primary groups of the set of primary groups;

means for implementing an optimization of the set of data objects and the defined plurality of new data objects to select at least one new data object from the defined plurality of new data objects to offset at least one data object of the set of data objects;

means for incorporating the at least one new data object of the plurality of new data objects into the set of data objects to effectuate adjustments to the set of data objects; and means for storing, in a memory, the adjustments to the set of data objects.

* * * * *